United States Patent
Zhang et al.

(10) Patent No.: US 11,930,158 B2
(45) Date of Patent: Mar. 12, 2024

(54) VIDEO SIGNAL IDENTIFICATION METHOD AND APPARATUS, ELECTRONIC DEVICE AND READABLE STORAGE MEDIUM

(71) Applicant: HANGZHOU HIKVISION DIGITAL TECHNOLOGY CO., LTD., Hangzhou (CN)

(72) Inventors: Hailong Zhang, Hangzhou (CN); Jun Wang, Hangzhou (CN); Qiang Ma, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 502 days.

(21) Appl. No.: 17/262,636

(22) PCT Filed: Jul. 23, 2019

(86) PCT No.: PCT/CN2019/097274
§ 371 (c)(1),
(2) Date: Jan. 22, 2021

(87) PCT Pub. No.: WO2020/020149
PCT Pub. Date: Jan. 30, 2020

(65) Prior Publication Data
US 2021/0274161 A1 Sep. 2, 2021

(30) Foreign Application Priority Data

Jul. 25, 2018 (CN) .......................... 201810827448.9
Jul. 25, 2018 (CN) .......................... 201810827454.4
Jul. 25, 2018 (CN) .......................... 201810827466.7

(51) Int. Cl.
*H04N 17/04* (2006.01)
*H04N 5/77* (2006.01)
(Continued)

(52) U.S. Cl.
CPC ............. *H04N 17/004* (2013.01); *H04N 5/77* (2013.01); *H04N 7/01* (2013.01)

(58) Field of Classification Search
CPC .......... H04N 17/004; H04N 5/77; H04N 7/01
See application file for complete search history.

(56) References Cited

U.S. PATENT DOCUMENTS 5,111,160 A    5/1992    Hershberger
5,812,210 A *   9/1998    Arai ..................... H04N 7/0105
                                                                                   348/E7.012

(Continued)

FOREIGN PATENT DOCUMENTS

CN        1642259        7/2005
CN        1698387       11/2005
(Continued)

OTHER PUBLICATIONS

CN Office Action issued in Appln. No. 2018108274489, dated Jun. 15, 2020, 10 pages (With English Translation).
(Continued)

*Primary Examiner* — Daniel T Tekle
(74) *Attorney, Agent, or Firm* — Fish & Richardson P.C.

(57) ABSTRACT

The present application provides a video signal identification method and apparatus, an electronic device and a readable storage medium. The method includes: reading a first register to obtain a format value of a video signal received (S100); in a case that the format value is shared by target video signals with multiple formats, configuring a second register according to at least one of the multiple formats for the target video signals, and detecting whether the video signal received is in a locked state (S110); and in response to configuring the second register according to a first target format and detecting that the video signal
(Continued)

received is in the locked state, determining that a format of the video signal received is the first target format (S120).

20 Claims, 10 Drawing Sheets

(51) Int. Cl.
*H04N 7/01* (2006.01)
*H04N 17/00* (2006.01)

(56) References Cited

U.S. PATENT DOCUMENTS

| | | | | |
|---|---|---|---|---|
| 6,157,739 | A * | 12/2000 | Yazawa | H04N 19/423 348/E7.003 |
| 6,330,034 | B1 * | 12/2001 | Renner | H03L 7/087 348/508 |
| 6,333,762 | B1 * | 12/2001 | Yoo | H04N 7/0135 348/E7.012 |
| 6,694,088 | B1 * | 2/2004 | Sakai | G11B 27/002 386/314 |
| 6,784,943 | B1 * | 8/2004 | Tults | H04N 7/035 348/E7.02 |
| 8,866,910 | B1 | 10/2014 | Cetin et al. | |
| 2004/0119819 | A1 * | 6/2004 | Aggarwal | G08B 13/19641 348/E7.086 |
| 2005/0091047 | A1 | 4/2005 | Gibbs et al. | |
| 2005/0128349 | A1 * | 6/2005 | Takamori | H04N 21/4402 348/E7.003 |
| 2005/0219366 | A1 * | 10/2005 | Hollowbush | H04N 17/004 348/184 |
| 2008/0100742 | A1 | 5/2008 | Mogre et al. | |
| 2008/0124044 | A1 * | 5/2008 | Park | H04N 5/77 386/E5.069 |
| 2009/0079870 | A1 * | 3/2009 | Matsui | G09G 5/008 348/558 |
| 2012/0069223 | A1 * | 3/2012 | Yamahata | H04N 23/695 348/E5.025 |
| 2012/0257106 | A1 * | 10/2012 | Hashi | H04N 7/012 348/E7.003 |
| 2013/0113994 | A1 * | 5/2013 | Chen | H04N 9/641 348/554 |
| 2015/0334186 | A1 * | 11/2015 | Chen | H04L 12/6418 348/143 |
| 2021/0274161 | A1 * | 9/2021 | Zhang | H04N 5/46 |

FOREIGN PATENT DOCUMENTS

| | | |
|---|---|---|
| CN | 1777257 | 5/2006 |
| CN | 101430874 | 5/2009 |
| CN | 101510975 | 8/2009 |
| CN | 101651534 | 2/2010 |
| CN | 101873464 | 10/2010 |
| CN | 101977289 | 2/2011 |
| CN | 102111625 | 6/2011 |
| CN | 102123261 | 7/2011 |
| CN | 201910861 | 7/2011 |
| CN | 102263981 | 11/2011 |
| CN | 102318340 | 1/2012 |
| CN | 102387327 | 3/2012 |
| CN | 102740086 | 10/2012 |
| CN | 104754272 | 7/2015 |
| CN | 105530444 | 4/2016 |
| CN | 105656480 | 6/2016 |
| CN | 105828014 | 8/2016 |
| CN | 106341575 | 1/2017 |
| CN | 106454208 | 2/2017 |
| CN | 106506904 | 3/2017 |
| CN | 106961598 | 7/2017 |
| CN | 107094239 | 8/2017 |
| EP | 1916841 | 4/2008 |
| EP | 2043355 | 4/2009 |
| JP | H11341431 | 12/1999 |

OTHER PUBLICATIONS

CN Office Action issued in Appln. No. 2018108274544, dated Nov. 13, 2020, 11 pages (With English Translation).
CN Office Action issued in Appln. No. 2018108274544, dated May 27, 2020, 11 pages (With English Translation).
CN Office Action issued in Appln. No. 2018108274667, dated Jul. 21, 2020, 10 pages (With English Translation).
PCT International Search Report in International Appln. No. PCT/CN2019/097274, dated Oct. 22, 2019, 4 pages (With English Translation).
PCT International Search Report in International Appln. No. PCT/CN2019/097293, dated Oct. 16, 2019, 4 pages (With English Translation).
CN Office Action issued in Chinese Appln. No. 202110221196.7, dated Mar. 3, 2022, 21 pages (With English Translation).
IN Office Action issued in Indian Appln. No. 202127007509, dated Jan. 18, 2022, 5 pages (With English Translation).
CN Office Action issued in Chinese Appln. No. 201810827454.4, dated Jun. 7, 2021, 8 pages (With English Translation).
Extended European Search Report issued in European Appln. No. 19840351.1, dated Aug. 4, 2021, 9 pages.
PCT Written Opinion in International Appln. No. PCT/CN2019/097274, dated Oct. 22, 2019, 10 pages (With English Translation).
PCT Written Opinion in International Appln. No. PCT/CN2019/097293, dated Oct. 16, 2019, 11 pages (With English Translation).

* cited by examiner

VIDEO SIGNAL IDENTIFICATION METHOD AND APPARATUS, ELECTRONIC DEVICE AND READABLE STORAGE MEDIUM

CROSS-REFERENCE TO RELATED APPLICATIONS

This application is a National Stage application under 35 U.S.C. § 371 of International Application No. PCT/CN2019/097274, having an International Filing Date of Jul. 23, 2019, which claims priority to Chinese Application Serial No. 201810827466.7, filed on Jul. 25, 2018, Chinese Application Serial No. 201810827448.9, filed on Jul. 25, 2018, and Chinese Application Serial No. 201810827454.4, filed on Jul. 25, 2018. The disclosures of the prior applications are considered part of the disclosure of this application, and are incorporated in their entireties into this application.

TECHNICAL FIELD

The present application relates to video monitoring technology, and in particular, to a video signal identification method and apparatus, an electronic device and a readable storage medium.

BACKGROUND

The traditional video surveillance industry mainly includes a video capturing device (such as, an analog camera) and a video storage device (such as a DVR (Digital Video Recorder)), etc. An external scene is captured by the video capturing device and then the captured video is transmitted to the video storage device for processing such as storage and video analysis.

For video signal transmission between the video capturing device and the video storage device, the video capturing device needs to modulate the output video signal, and the video storage device needs to demodulate the input video signal. Since there are a plurality of types of video capturing devices, and the corresponding video signals have different formats, to ensure compatible access of the video signals, the video storage device needs to accurately identify the received video signals.

SUMMARY

Based on this, the present application provides a video signal identification method and apparatus, an electronic device and a readable storage medium.

Specifically, the present application is implemented by the following technical solutions.

According to a first aspect of embodiments of the present application, a video signal identification method is provided and includes: reading a first register to obtain a format value of a video signal received; in a case that the format value is shared by target video signals with multiple formats, configuring a second register according to at least one of the multiple formats for the target video signals, and detecting whether the video signal received is in a locked state; and if configuring the second register according to a first target format and detecting that the video signal received is in the locked state, determining that a format of the video signal received is the first target format, wherein the first target format is a format of a first target video signal in the target video signals.

According to a second aspect of embodiments of the present application, a video signal identification apparatus is provided and includes: a reading unit, configured to read a first register to obtain a format value of a video signal received; a configuring unit, configured to: in a case that the format value is shared by target video signals with multiple formats, configure a second register according to at least one of the multiple formats for the target video signals; a lock detecting unit, configured to detect whether the video signal received is in a locked state; and a first format determining unit, configured to determine that a format of the video signal received is the first target format if the second register is configured according to a first target format and it is detected that the video signal received is in the locked state, wherein the first target format is a format of a first target video signal in the target video signals.

According to a third aspect of embodiments of the present application, an electronic device is provided and includes: a processor, a communication interface, a memory and a communication bus, wherein the processor, the communication interface, and the memory communicate with each other through the communication bus. The memory is configured to store a computer program. The processor is configured to implement the video signal identification method when executing the computer program stored in the memory.

According to a fourth aspect of embodiments of the present application, a computer readable storage medium storing a computer program is provided. When executing the computer program, the video signal identification method is implemented.

According to the video signal identification method in embodiments of the present application, by reading a first register, a format value of a video signal received is obtained; in a case that the format value is shared by target video signals with multiple formats, a second register is configured according to at least one of the multiple formats for the target video signals, and it is detected whether the video signal received is in a locked state; and if configuring the second register according to a first target format and detecting that the video signal received is in the locked state, a format of the video signal received is determined as the first target format. The video signal identification method provided in the present application improves the accuracy of video signal identification.

DETAILED DESCRIPTION OF THE EMBODIMENTS

Exemplary embodiments will be described in detail herein, examples of which are shown in the accompanying drawings. The following description relates to the drawings, unless otherwise indicated, the same numerals in the different drawings represent the same or similar elements. The embodiments described in the following exemplary embodiments do not represent all embodiments consistent with the present application. Rather, they are merely examples of apparatuses and methods consistent with some aspects of the present application as detailed in the appended claims.

The terms used in the present application is for the purpose of describing particular embodiments only and is not intended to limit the present application. The singular form "a/an", "said", and "the" used in the present application and the attached claims are also intended to include the plural form, unless other meanings are clearly represented in the context.

To make a person skilled in the art better understand the technical solutions in the embodiments of the present application, and to enable the aforementioned purposes, features, and advantages of the embodiments of the present application to be more obvious and understandable, the technical solutions in the embodiments of the present application are further explained in detail below by combining the accompanying drawings.

Figure 1:
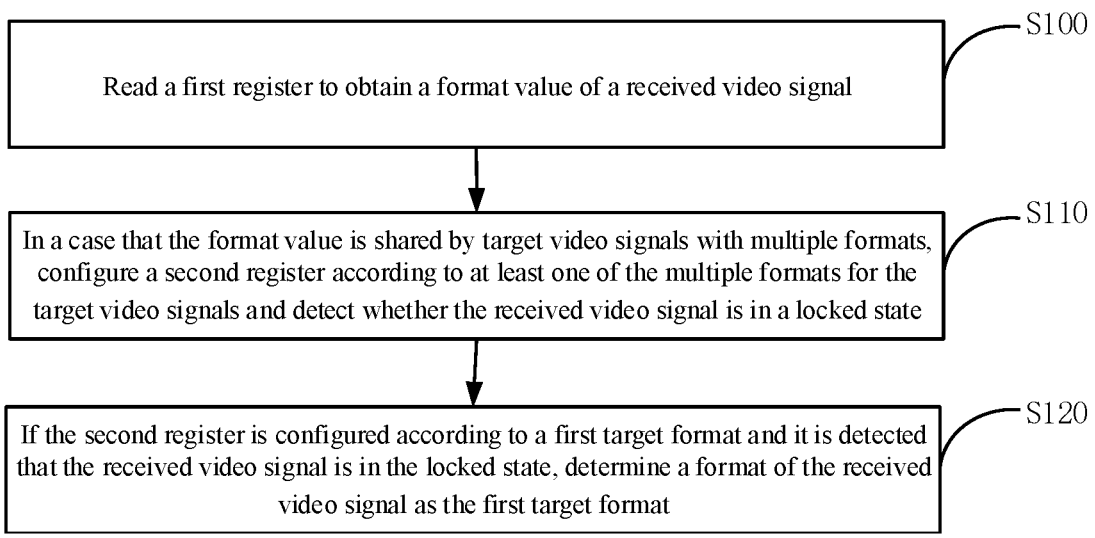
FIG. 1 is a flowchart of a video signal format identification method according to an exemplary embodiment of the present application.

Please refer to FIG. 1, it is a schematic flowchart of a video signal identification method according to an embodiment of the present application. The video signal identification method may be applied to a video processing device having an AD (Analog-to-Digital Conversion) chip, such as an AD chip of a DVR (hereinafter, taking the video processing device as a DVR as an example). As shown in FIG. 1, the method may include the following steps.

It is noted that, in embodiments of the present application, if not specifically described, the video signals mentioned are all analog video signals, and the embodiments of the present application will not be described later.

At step S100, a first register is read to obtain a format value of a received video signal.

In embodiments of the present application, when receiving a video signal, the AD chip configures a value of format information (herein, referred to as a format value for short) of the video signal in an address of a particular register according to the format information of the video signal. The particular register may be referred to as a first register.

For example, the AD chip may record the format information of the received video signal in bit 0 to bit 2 of the register having the address of 0x3.

Formats for video signals can include, but are not limited to, NTSC (National Television Standards Committee), PAL (Phase Alteration Line), 720P25/30, 720P50/60, 1080P25/30, 1080P HALF25/30, 3M18, 4M12.5/15, 4M25/30, 4M HALF 25/30, 5M12, 5M20, 5M HALF 20, 8M12.5/15, 8M HALF 12.5/15, etc. Video signals with each format have a corresponding format value.

Correspondingly, in a case that the video signal format needs to be identified, a SoC (System-on-a-Chip) chip of the DVR can obtain the format value by reading the first register of the AD chip. Certainly, the DVR may also use a chip such as a CPU (Central Processing Unit) or a DSP (Digital Signal Processing) to read a register value of the AD chip, which is not limited in the present application. With the format value, in some cases, the format of the received video signal can be directly determined.

For example, the SoC chip may read values of bit0 to bit2 of the register having the address of 0x3.

At step S110, in a case that the format value is shared by target video signals with multiple formats, a second register is configured according to at least one of the multiple formats for the target video signals, and it is detected whether the received video signal is in a locked state.

In embodiments of the present application, in a practical application scene, format values of video signals with multiple formats may be identical, that is, video signals with multiple formats may share the same format value. Thus, a format of a video signal cannot be identified accurately only according to a format value.

For example, if the format value is 0x6, video signal formats corresponding to the format value may be NTSC or PAL. If the format value is 0x7, video signal formats corresponding to the format value may be 3M18, 5M12 or 5M20.

Correspondingly, when the SoC chip of the DVR reads the format value of the first register, the SoC chip can determine whether the format value is shared by target video signals with multiple formats, and in response to determining that the format value is shared by the target video signals with multiple formats, the format of the received video signal is further identified according to other policies.

In embodiments of the present application, in response to determining that the format value read is shared by video signals with multiple formats (herein referred to as target video signals), the SoC chip may configure a second register of the AD chip according to at least one of the multiple formats for the target video signals, and detect whether the received video signal is locked.

For example, a polling manner can be used. A format of each target video signal is respectively selected, a second register is configured according to the selected format of the target video signal, and whether the received video signal is in a locked state is detected.

For the specific implementation of configuring the second register of the AD chip according to the selected format, reference may be made to the related description in the existing related art, and details are not described herein in embodiments of the present application.

For example, assuming that the format values read by the SoC chip correspond to the target video signals with formats 1 to 3 (assuming that the target video signals are respectively target video signals 1 to 3), the SoC chip can first select format 1 according to the ascending order of formats 1 to 3, configure a second register corresponding to format 1 according to format 1, and detect whether a received video signal is in a locked state; if the received video signal is in an unlocked state, then the SoC chip can select format 2, configure a second register corresponding to format 2 according to format 2, and detect whether a received video signal is in a locked state; if the received video signal is in the unlocked state, then the SoC chip can select format 3, configure a second register corresponding to format 3 according to format 3, and detect whether a received video signal is in the locked state. It is noted that the specific addresses of the second registers corresponding to various formats may be different, and may also include a plurality of register addresses; and however, since functions implemented by these registers are similar, these registers are uniformly referred to as the second registers in the present application.

At step S120, if the second register is configured according to a first target format and it is detected that the received video signal is in the locked state, a format of the received video signal is determined as the first target format.

In embodiments of the present application, the first target format does not specifically refer to a certain unchanged/fixed format, but may refer to a format of any one of the target video signals (referred to herein as a first target video signal).

In embodiments of the present application, if the second register is configured according to the first target format and the received video signal is detected to be locked, the SoC chip may stop format selection and the configuration of the second register, and determine that the format of the received video signal is the first target format.

Detecting that the received video signal is in a locked state can include detecting that a state of a HLOCK (Horizontal Phase Lock Loop Lock) and a state of a VLOCK (Vertical Phase Lock Loop Lock, which may also be referred to as a frame synchronization signal lock) of the received video signal are both locked.

For the specific implementation of determining whether the state of the HLOCK or the state of the VLOCK of the video signal is in the locked state, reference may be made to the related description in the existing related art, and details are not described herein in the embodiments of the present application.

In an embodiment of the present application, configuring the second register according to at least one of the multiple formats for the target video signals, and detecting whether the received video signal is in the locked state can include: determining a priority of a format of each of the target video signals with the multiple formats; configuring the second register corresponding to the format of the at least one of the target video signals according to a descending order of the priorities and detecting whether the received video signal is in the locked state; and in response to detecting that the received video signal is in the locked state, determining the format of the received video signal as the first target format.

In this embodiment, in response to determining that the read format value is shared by the target video signals with multiple formats, the priority of the format for each target video signal can be determined.

For example, the user can determine the priority of the format of each target video signal according to the usage probability of the format of each target video signal. The usage probability of the format of each target video signal can be an experience value, and can be pre-configured in the AD chip or the SoC chip. The higher the usage probability of the target video signal is, the higher the priority is.

In this embodiment, after the priority of each target video signal is determined, the SoC chip can poll/take turn each target video signal according to a descending order of the priorities to configure a second register corresponding to the format of at least one of the target video signals, and detect whether the received video signal is in a locked state. In response to detecting that the received video signal is in the locked state, the SoC chip determines the format for configuring the second register at this time as the first target format, and stops polling.

For example, assuming that the read format value is V1, the format value is shared by the video signals with the format 1 and the format 2, and the usage probability of the format 1 is higher than the usage probability of the format 2, the SoC chip can determine that the priority of the format 1 is higher than the priority of the format 2, and correspondingly, the SoC chip can first configure a second register corresponding to the format 1 according to the format 1, and detect whether the received video signal is in a locked state. If the video signal is in the locked state, it is determined that the format of the received video signal is the format 1, and the step of configuring the second register is ended. If the video signal is in the unlocked state, the second register corresponding to the format 2 can be configured according to the format 2, and it is detected whether the received video signal is locked, and if the received video signal is in the locked state, it is determined that the format of the received video signal is the format 2.

It is noted that, in embodiments of the present application, upon detecting that none of the received video signals are in the locked state in a case that the SoC chip configures the second registers of the AD chip according to the format of each target video signal, the AD chip may re-identify the format of the received video signal in a certain number of times (which may be set according to an actual scene) according to the manner described in steps S100 to S120, or identify the format of the received video signal according to other policies. The specific implementation format thereof is not limited in the present application.

Further, in this embodiment, after the second register is configured according to a particular format, even if a format of a video signal received by the AD chip is the same as the particular format, a time period is also required to detect that the video signal is in a locked state. Therefore, to improve the accuracy of detecting that the video signal is in the locked state, the SoC chip can configure the second register in multiple times according to the same format, and determine whether the received video signal is in a locked state for a plurality of times.

Correspondingly, in an implementation of this embodiment, configuring the second register corresponding to the format of the at least one of the target video signals according to a descending order of the priorities and detecting whether the received video signal is in the locked state can include:

configuring a second register according to a format of the target video signal with i-th priority; in response to determining that the number of configurations is less than Ni and the received video signal is in a locked state, determining the format of the target video signal as the format of the i-th target video signal and exiting the process of configuring the second register; and in response to determining that the received video signal is in an unlocked state, continuing to configure the second register according to the format of the target video signal with i-th priority and adding 1 to the number of configurations.

In response to determining that the number of configurations is equal to Ni and the received video signal is in the locked state, the format of the target video signal is determined as the format of the i-th target video signal and the process of configuring the second register is exited.

In response to determining that the number of configurations is equal to Ni and the received video signal is in the unlocked state, i is set to equal to i+1, the above step of configuration and checking the locked state is repeated until the received video signal is in the locked state, or the formats of all of the target video signals have been traversed/gone, but the received video signal is still in the unlocked state. In an optional embodiment, the initial value of i may be 1 and i is a natural number. In another optional embodiment, the initial value of i may be 0 and i is a natural number.

In this implementation, different number of configurations may be set for the format of each target video signal according to different priorities of the target video signals, that is, the values of Ni may be different from each other.

The number of configurations for configuring the second register corresponding to the format of the target video signal with i-th priority is Ni. The larger i is, the lower the priority (that is, ranking according to a descending order of the priorities) is. In an optional embodiment, $1 \leq i \leq n$ represents the number of formats for the target video signals. In another optional embodiment, $0 \leq i \leq n-1$ represents the number of formats for the target video signals.

In this implementation, a second register can be first configured according to a format of the target video signal with the first priority (i.e., the highest priority), and in a case that the number of configurations is less than or equal to N1, if the received video signal is in the locked state, the format of the target video signal is determined as the format of the target video signal with the first priority and the process of configuration is exited.

After the second register is configured each time, whether the received video signal is in the locked state can be determined. If the received video signal is detected to be in the unlocked state, the next configuration and determination can be continued.

In this implementation, if the number of times for configuring the second register according to the format of the target video signal with the first priority reaches N1 and the received video signal is still in the unlocked state, the SoC chip can configure a second register according to a format of the target video signal with the second priority (i.e., a priority adjacent to the first priority). If the number of configurations is less than or equal to N2, if the received video signal is in the locked state, it is determined that the format of the target video signal is the format of the target video signal with the second priority, and the configuration process is exited. If the number of configurations reaches N2 and the received video signal is still in the unlocked state, a second register is configured according to a format of the target video signal with the third priority.

And so on, until the number of times that the SoC chip configures a second register according to a format of the target video signal with the n-th priority (i.e., the lowest priority) reaches Nn and the received video signal is still in the unlocked state, the format of the received video signal can be re-identified in the manner described in this embodiment for a certain number of times (which may be set according to an actual scene). Or the format of the received video signal is identified according to other policies. The specific implementation format thereof is not limited in the present application.

Preferably, Ni>1.

In an example, the smaller the i, the larger the Ni, that is, the higher the priority of the format of the target video signal, the more the number of times for configuring the second register according to the format of the target video signal.

For example, assuming that the format value read by the SoC chip is V1, the format value is shared by the video signals with the format 1 and the format 2, and the usage probability of the format 1 is higher than the usage probability of the format 2, it can be determined that the priority of the format 1 is higher than the priority of the format 2. Accordingly, the number of times that the SoC chip configures the second register according to the format 1 is greater than the number of times that the second register is configured according to the format 2, for example, the number of times that the second register is configured according to the format 1 is 6, and the number of times that the second register is configured according to the format 2 is 3.

Further, in embodiments of the present application, in a practical application scene, in a case that video signals with multiple formats share a same format value, line durations of the video signals may be different. At this time, the formats for the video signals may be identified according to the line durations of the video signals.

Accordingly, in an embodiment of the present application, in a case that the read format value is shared by the target video signals with multiple formats, before configuring the second register according to at least one of the multiple formats for the target video signals, the method can further include: determining line durations of the target video signals; if at least two of the target video signals have a same line duration, performing the step of configuring the second register according to the at least one of the multiple formats for the target video signals; and if none of the line durations of the target video signals is the same, determining, according to the respective line durations of the target video signals and a line duration of the received video signal, the format of the received video signal.

In this embodiment, in a case that the SoC chip determines that the read format value is shared by the target video signals with multiple formats, the line duration of each of the plurality of target video signals can be determined respectively.

If at least two of the plurality of target video signals have a same line duration, the format of the target video signal can be identified with the manner described at steps S110 to S120.

If none of the line durations of the plurality of target video signals is the same, the SoC chip can determine the format of the received video signal according to the line duration of each of the plurality of target video signals and a line duration of the received video signal.

It is noted that, in embodiments of the present disclosure, in a case that the line durations of the plurality of target video signals are different, the SoC chip can also identify the format of the target video signal with the manner described at steps S110 to S120.

In addition, if the number of target video signals is three or more, and not all of the line durations of the plurality of target video signals are the same (that is, line durations of partial target video signals are the same and line durations of partial target video signals are different), the SoC chip may first identify the format of the received video signal according to the line duration. In a case that the format of the received video signal cannot be identified according to the line duration (that is, there are at least two target video signals with the same line duration as the received video signal), video signal format identification is further performed with the manner described at step S110 to step S120. Alternatively, the video signal format identification can be directly performed with the manner described at step S110 to step S120.

In an implementation of the embodiment, determining the format of the received video signal according to the line durations of the target video signals and a line duration of the received video signal includes: reading a third register to obtain a line duration value; comparing the line duration value and the line duration of each of the target video signals; and in response to determining that the line duration value is the same as the line duration of one of the target video signals, determining a format of the one of target video signals as the format of the received video signal, that is, the first target format.

In the implementation, the SoC chip can determine a line duration of a received video signal according to a line duration value obtained by reading the third register of the AD chip, compare the line duration of the received video signal and the line duration of each target video signal, and determine the format of one of the target video signals whose line duration is the same as the line duration of the received video signal as the format of the received video signal.

For the specific implementation of determining a line duration of a received video signal according to a line duration value obtained by reading the third register of the AD chip, reference may be made to the related description in the existing related art, and details are not described herein in embodiments of the present application.

To make those skilled in the art better understand the technical solutions provided by the embodiments of the present application, the technical solutions provided by the embodiments of the present application will be described below with reference to specific examples.

In this embodiment, taking formats for video signals including NTSC, PAL, 720P25/30, 720P50/60, 1080P25/30, 1080P HALF25/30, 3M18, 4M12.5/15, 4M25/30, 4M HALF 25/30, 5M12, 5M20, 5M HALF 20, 8M12.5/15 and 8M HALF 12.5/15 as an example, 3M18, 5M12 and 5M20 share a same format value, line durations of video signals with the three formats are different, at most two of the remaining formats share a same format value, such as 4M25 and 720P50; 4M30 and 720P60; 1080P25 and 8M12.5; 1080P30 and 8M15; NTSC and PAL; 4M12.5 and 720P25; and 4M15 and 720P30. Line durations of the video signals with two formats sharing a format value is the same.

Figure 3:
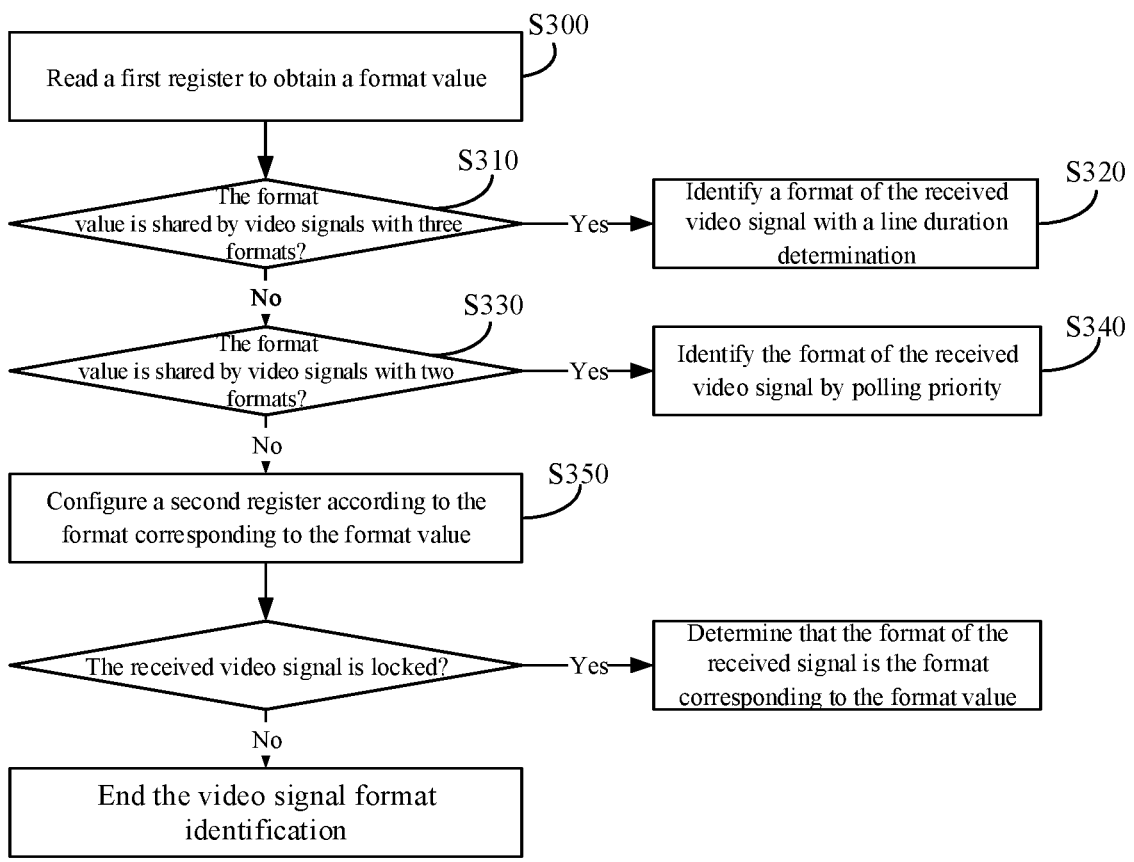
FIG. 3 is a flowchart of a video signal format identification method according to another exemplary embodiment of the present application.

In this embodiment, the implementation process of video signal format identification solutions can be shown in FIG. 3, which can include the following steps.

At step S300, a first register is read to obtain a format value of a received video signal.

At step S310, it is determined whether the format value is shared by video signals with three formats. If yes, the process proceeds to step S320; and otherwise, the process proceeds to step S330.

At step S320, a format of the received video signal is identified with a line duration determination.

In the embodiment, in response to determining that the read format value is shared by video signals with three formats, the SoC chip can determine that the format of the received video signal is 3M18, 5M12 or 5M20.

At this case, the line duration determination can be used to identify the format of the received video signal, that is, the SOC chip can read the third register to obtain a line duration value, determine the line duration of the received video signal, and compare the line duration of the received video signal with the line durations of the video signals with 3M18, 5M12 and 5M20 respectively. If a comparison result represents that the line length of one of the video signals with 3M18, 5M12 and 5M20 is the same as the line length of the received video signal, the format of the one of the video signals with 3M18, 5M12 and 5M20 is determined as the format of the received video signal, that is, the first target format.

At step S330, it is determined whether the format value is shared by video signals with two formats. If yes, the process proceeds to step S340; and otherwise, the process proceeds to step S350.

At step S340, the format of the received video signal is identified by polling priority.

In the embodiment, in response to determining that the read format value is shared by video signals with two formats, the SoC chip can identify the format of the received video signal by polling priority. That is, priorities of the video signals with the two formats corresponding to the format value can be determined firstly, a second register is configured firstly according to a format of the video signal with a higher priority, and it is detected whether a received video signal is in a locked state, and if the received video signal is in an unlocked state, a second register is configured according to a format of the video signal with a lower priority, and it is detected whether a received video signal is in a locked state.

Figure 4:
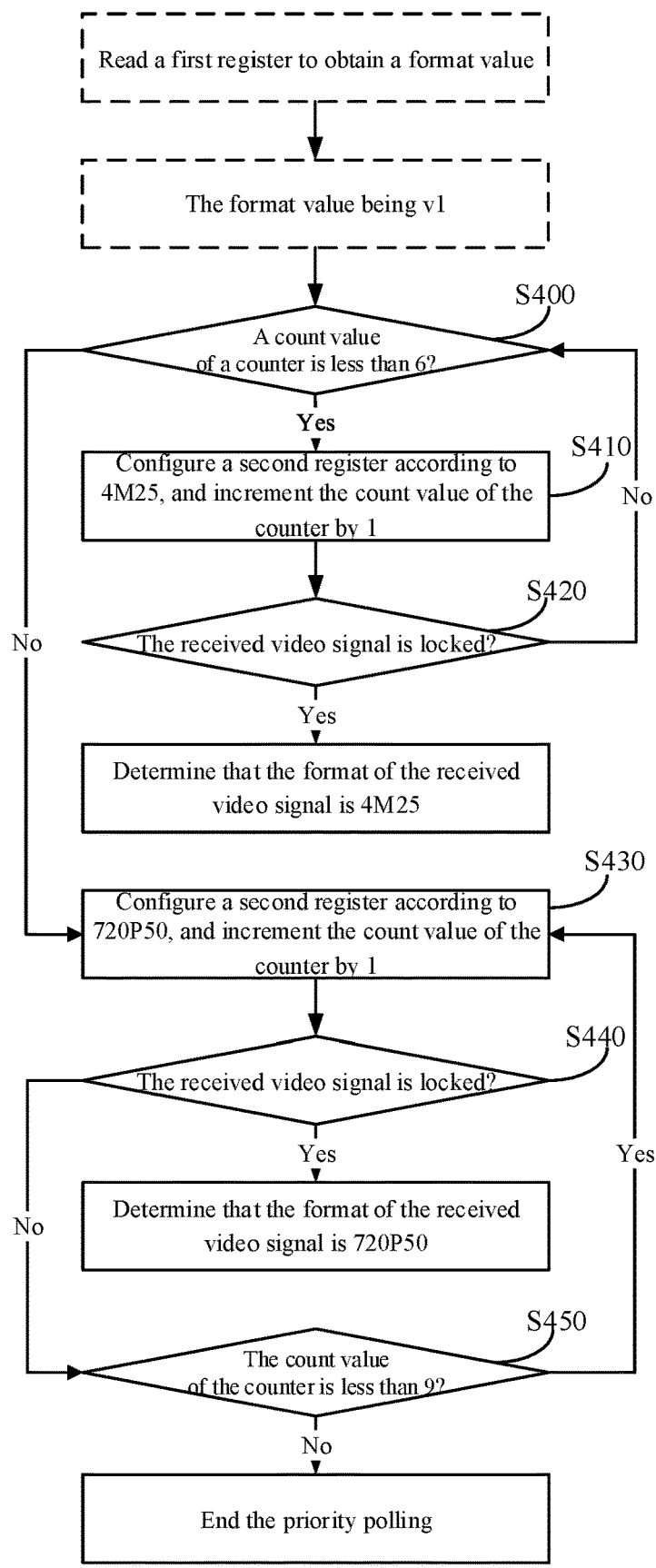
FIG. 4 is a schematic diagram of a system for identifying a received video signal by using a priority polling method according to an exemplary embodiment of the present application.

For example, taking the formats being 4M25 and 720P50 as an example (assuming that the format values of the two formats are v1), since the usage probability of 4M25 is much higher than 720P50, the priority of 4M25 is higher than that of 720P50. If the obtained value of the first register is v1, the SoC chip can determine that the format value is shared by 4M25 and 720P50, and at this time, the specific implementation of the AD chip identifying the format of the received video signal by polling priority can be shown in FIG. 4, which can include the following steps.

At step S400, it is determined whether a count value of a counter is less than 6. If the count value is less than 6, the process proceeds to step S410; and otherwise, the process proceeds to step S430.

At step S410, a second register is configured according to 4M25, and the count value of the counter is incremented by 1.

At step S420, it is detected whether the received video signal is in a locked state. If the received video signal is in the locked state, it is determined that the format of the received video signal is 4M25, and the priority polling is ended; and otherwise, the process proceeds to step S400.

In this example, it is assumed that during one priority polling process, a register is firstly configured according to 4M25 and whether the received video signal is in a locked state is detected; if the received video signal is in the unlocked state, a second register is continuously configured according to 4M25, and whether the received video signal is in the locked state is detected; or if the number of times for configuring a register according to 4M25 reaches 6, the received video signal is still unlocked.

At step S430, a second register is configured according to 720P50, and the count value of the counter is incremented by 1.

At step S440, it is detected whether the received video signal is in a locked state. If the received video signal is in the locked state, it is determined that the format of the received video signal is 720P50, and the priority polling is ended; and otherwise, the process proceeds to step S450.

At step S450, it is determined whether the count value of the counter is less than 9. If the count value is less than 9, the process proceeds to step S430; and otherwise, the priority polling is ended.

In this example, if second registers are configured according to 4M25 for six times and the received video signal is still in the unlocked state, the SOC chip can configure the second register according to 720P50 and detect whether the received video signal is in the locked state. If at this time, the received video signal is still in the unlocked state, then the SOC chip continues to configure the second register according to 720P50, and detects whether the received video signal is in the locked state. If second registers are configured according to 720P50 for 3 times and the received video signal is still in the unlocked state, the priority polling is ended.

It is noted that in this example, if the count value of the counter reaches 9 (that is, the number of times for configuring second registers according to 4M25 reaches 6, and the number of times for configuring second registers according to 720P50 reaches 3) and the received video signal is still in the unlocked state, the SOC chip can also clear the counter to 0, re-determine the format value of the received video signal, and start a new video signal format identification with the above manner, or identify the video signal format according to other policies. Embodiments of the present application do not limit this.

In addition, if the SoC chip detects that the received video signal is locked, the priority polling is ended and the counter can also be cleared to zero.

At step S350, a second register is configured according to the format corresponding to the format value, and whether the received video signal is in the locked state is detected. If the received video signal is in the locked state, it is determined that the format of the received signal is the format corresponding to the format value; and otherwise, the video signal format identification is ended.

In this embodiment, if it is determined that the read format value is not shared by video signals with multiple formats, the SoC chip can directly configure a second register according to the format corresponding to the format value and detect whether the received video signal is in the locked state, and if the received video signal is in the locked state, determine that the format of the received signal is the format corresponding to the format value. In other words, even if there is only one format using the format value, it is necessary to determine whether to lock. Because in actual use, there are cases where the video signal format is correct, but the video signal content is abnormal.

It is noted that in this embodiment, if the format of the received video signal is not identified with the manner described at steps S300 to S350, the SoC chip can re-perform a new video signal format identification with the manner described at S300 to S350, or identify the video signal format according to other policies. Embodiments of the present application do not limit this.

In embodiments of the present application, a first register is first read to obtain a format value of a received video signal; in a case that the format value is shared by target video signals with multiple formats, a second register is configured according to at least one of the multiple formats for the target video signals, and it is detected whether the received video signal is in a locked state; and if the second register is configured according to a first target format and it is detected that the received video signal is in the locked state, a format of the received video signal is determined as the first target format. By the method provided in the present application, the accuracy of video signal identification can be improved.

After the SoC chip of the DVR determines the format of the received video signal, it is necessary to further determine a type of a video signal because a video signal with a format may also correspond to multiple types. For example, for a video signal with format 1080P25/30, the types of the video signal include TVI (Transport Video Interface), AHD (Analog High Definition), etc.

Figure 5:
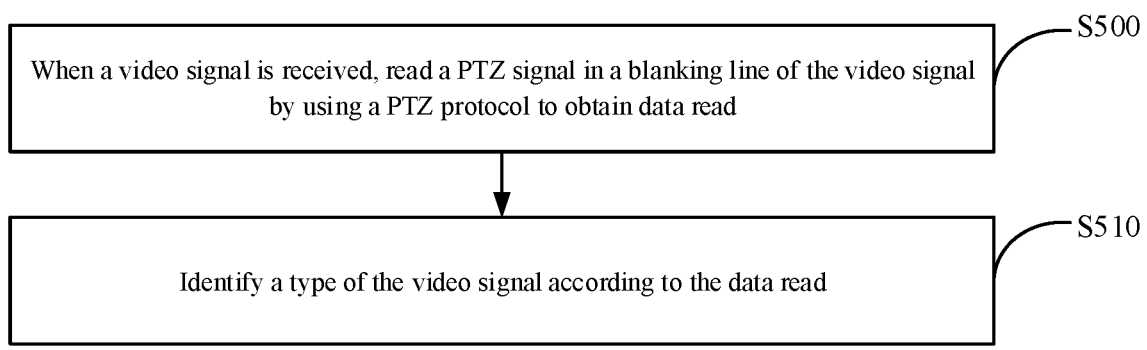
FIG. 5 is a flowchart of a video signal type identification method according to an exemplary embodiment of the present application.

Referring to FIG. 5, it is a schematic flowchart of a video signal type identification method according to an embodiment of the present application. The method may include the following steps.

At step S500, when a video signal is received, a PTZ signal in a blanking line of the video signal is read by using a PTZ protocol to obtain data read.

The PTZ (Pan/Tilt/Zoom) protocol was developed to enable video capturing devices and video storage devices to communicate. The video capturing device can interact with the video storage device with language information through the PTZ protocol, for example, the video capturing device can control the video capturing device to adjust the focal length through the PTZ protocol.

In embodiments of the present application, for different video signals, PTZ protocol requires that different signals are inserted into different blanking lines, thus making a more obvious difference between amplitudes of the relevant blanking lines. Therefore, after the DVR receives a video signal and determines that a format of the video signal is the first target format, the DVR first determines whether the first target format includes multiple types, such as whether the first target format includes two or three of multiple signal types such as TVI, AHD, etc. In a case that the first target format includes multiple types, the AD chip can use the PTZ protocol to read the PTZ signal in the blanking line amplitude of the video signal, such as read the PTZ signal in the blanking line of the video signal according to preset PTZ signal reception parameters.

The preset PTZ signal reception parameters can be set according to features of the blanking line of the video signal, and include but not limited to, a serial number of the blanking line read, a start bit of the blanking line read, the number of bits of the blanking line read (such as, 24 bits), and a pulse width, etc.

Figure 2:
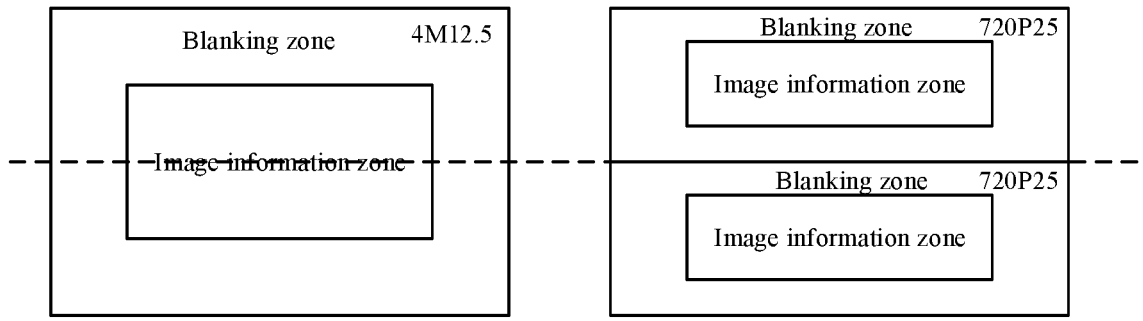
FIG. 2 is a schematic diagram of a frame of video signal with 4M12.5 and two frames of video signal with 720P25 according to an exemplary embodiment of the present application.

Referring to FIG. 2, each frame of video signal includes an image information zone and a blanking zone. The image information zone stores a frame of valid image data. The blanking zone can store specific information at specific locations, and a signal amplitude at a location where no specific information is stored can be zero. For example, the first several lines of the blanking zone may include a field synchronization signal, some lines may include a PTZ signal, etc. The PTZ signal can be a signal of a number of bytes located at a specific position in a line of the blanking zone. The PTZ signal can generally be considered as a digital signal, that is, in the video signal, the high level of the PTZ signal can always be a level that exceeds a high level discrimination threshold, and the low level of the PTZ signal can always be a level that is less than a low level discrimination threshold. The specific form of the PTZ signal is determined by the PTZ protocol, and the present application does not limit this.

Specifically, the PTZ signal in the blanking line of the video signal can be read by using the PTZ protocol. Starting from a parameter-specified blanking line and a start bit of the blanking line, the number of parameter-specified bits (such as, 24 bits) can be read according to the pulse width determined by the parameter, thereby obtaining a multi-bit value. The multi-bit value can be further analyzed according to the PTZ protocol to obtain the specific data read.

At step S510, a type of the video signal is identified according to the data read.

In embodiments of the present application, a type of the video signal can be identified according to a value obtained after reading a PTZ signal of the video signal by using a PTZ protocol.

Further, in embodiments of the present application, there is a sine wave in a bottom fourth blanking line of the video signal with a particular type (herein referred to as a target type), the duration of the sine wave is usually about one line, while there is no sine wave in a bottom fourth blanking line of video signals with other types. Thus, it is also possible to determine whether a video signal is a target type based on the presence or absence of a sine wave in the bottom fourth line of the video signal. In an example, the target type is TVI type.

Correspondingly, before reading the PTZ signal in the blanking line of the video signal by using the PTZ protocol, the method further includes: detecting whether a sine wave exists in a bottom fourth blanking line of the video signal; if determining that the sine wave exists, determining that the type of the video signal is a target type; and otherwise, performing the above step of reading the PTZ signal in the blanking line of the video signal by using the PTZ protocol.

In embodiments of the present application, when the DVR receives a video signal, the DVR can detect the presence or absence of a sine wave in the bottom fourth blanking line of the received video signal through the AD chip.

If the AD chip detects that a sine wave exists in the bottom fourth blanking line of the video signal, that is, it is determined that the type of the received video signal is a target type, a value of a bit of a fourth register may be set to 1. If it is detected that there is no sine wave in the bottom fourth blanking line of the video signal, that is, it is determined that the type of the received video signal is not a target type, the value of the bit of the fourth register may be set to 0. For example, an address of the fourth register may be 0x4, and the bit may be bit2. Furthermore, the SoC chip of the DVR may determine whether the type of the received video signal is a target type by reading the value of the bit of the fourth register of the AD chip.

If the AD chip of the DVR detects that a sine wave exists in the bottom fourth blanking line of the received video signal, the SoC chip may determine that the type of the video signal is a target type.

If the AD chip of the DVR detects that there is no sine wave in the bottom fourth blanking line of the received video signal, the AD chip may further use the PTZ protocol to read the PTZ signal in the blanking line of the video signal to obtain the data read, and the SoC chip identifies the type of the video signal according to the data read.

In an embodiment of the present application, reading the PTZ signal in the blanking line of the video signal by using the PTZ protocol to obtain data read can include: reading a PTZ signal in a first target blanking line of the video signal by using the PTZ protocol to obtain first data read. Correspondingly, identifying the type of the video signal according to the data read can include: identifying the type of the video signal according to the first data after reading.

In this embodiment, PTZ signals of different video signals are located in particular partial blanking lines (herein any one of the particular partial blanking lines is referred to as a first target blanking line), and in this way, amplitudes of the particular partial blanking lines are significantly different. Therefore, the PTZ protocol may be used to read the PTZ signal in the first target blanking line to identify the type of the video signal.

In an example, the first target blanking line is any one of the 23-th to 26-th blanking lines of the video signal.

In this example, the AD chip can read any one blanking line (that is, a first target blanking line) in the 23-th to 26-th blanking lines of the received video signal and obtain the first data read according to the PTZ signal in the first target blanking line. Then the SoC chip identifies the type of the video signal according to the first data.

In an implementation of the embodiment, identifying the type of the video signal according to the first data read can include: if the first data is 0x00, identifying the type of the video signal as a first type; and if the first data is greater than 0x00, identifying the type of the video signal as a second type.

The first type and the second type are different from the target type.

In this embodiment, the first data of the video signal with the first type is generally 0x00, and the first data of the video signal with the second type is generally data greater than 0x00, and thus the type of the video signal of which the first data is 0x00 is the first type, and the type of the video signal of which the first data is greater than 0x00 is the second type.

Correspondingly, in this embodiment, if the first data of the video signal read by the AD chip is 0x00, the SoC chip may identify that the type of the video signal is the first type; and if the first data of the video signal read by the AD chip is greater than 0x00, the SoC chip may identify that the type of the video signal is the second type.

In another embodiment of the present application, according to the format of the video signal, reading the PTZ signal in the blanking line of the video signal by using the PTZ protocol to obtain the data read can include: reading the PTZ signal in a second target blanking line of the video signal by using the PTZ protocol to obtain second data read. Correspondingly, identifying the type of the video signal according to the data obtained after reading can include: identifying the type of the video signal according to the second data obtained after reading.

In this embodiment, there are multiple video signal formats, and video signals with different formats may use different blanking lines to distinguish the types of video signals. Therefore, if only the first target blanking line is used to distinguish, the specific type of the video signal may not be correctly determined under certain video signal formats, and thus the second target blanking line is introduced. For the video signal with the first type and the video signal with the second type, in addition to the possible insertion of PTZ signals into the first target blanking line, it is also possible to insert a PTZ signal in other partial blanking lines (herein any one of the other partial blanking lines is referred to as a second target blanking line). Thus, the amplitudes of the other partial blanking lines are significantly different. Therefore, the PTZ protocol can be used to read the PTZ signal in the second target blanking line to identify the type of the video signal.

The first target blanking line is different from the second target blanking line. In an example, the second target blanking line is any one of the 6-th to 7-th blanking lines of the video signal.

In this example, since there is a significant difference in the amplitudes of the 6-th to 7-th blanking lines of the first type video signal and the second type video signal, if the SoC chip determines that the type of the received video signal is not the target type, the SoC chip can instruct the AD chip to read any of the 6-th to 7-th blanking lines of the received video signal (i.e., the second target blanking line) and obtain the second data read according to the PTZ signal in the second target blanking line. Then the SoC chip identifies the type of the video signal as the first type or the second type according to the second data.

In an implementation of the embodiment, identifying the type of the video signal according to the second data obtained after reading can include: if the second data is 0xff, identifying the type of the video signal as a first type; and if the second data is greater than 0x00 and less than 0xff, identifying the type of the video signal as the second type.

In this implementation, the second data of the video signal with the first type is generally 0xff or 0x00, and the second data of most of the video signals with the second type is generally data between 0x00 and 0xff, that is, data greater than 0x00 and less than 0xff, the type of the video signal of which the second data is 0xff is the first type, and the type of the video signal of which the second data is data between 0x00 and 0xff is the second type.

Accordingly, in this implementation, if the second data of the video signal read by the AD chip is 0xff, the SoC chip may identify the type of the video signal as the first type. If the second data of the video signal read by the AD chip is any data between 0x00 and 0xff, that is, greater than 0x00 and less than 0xff, the SoC chip may identify that the type of the video signal is the second type.

Further, in some cases, the second data of the video signal with the second type may be 0x00, and therefore, if the second data of the video signal read by the AD chip is 0x00, the type of the video signal may be the second type or the first type, and the SoC chip needs to further identify the type of the video signal according to other policies.

Accordingly, in another implementation of the embodiment, identifying the type of the video signal according to the second data can include: if the second data is 0x00, identifying the type of the video signal according to a detection state and a locked state of a Carrier PLL (phase lock loop) Lock of the video signal.

In this implementation, if the second data of the video signal read by the AD chip is 0x00, the SoC chip may further identify the type of the video signal according to the detection state and the locked state of the Carrier PLL Lock of the video signal.

In an example, identifying the type of the video signal according to the detection state and the locked state of the Carrier PLL Lock of the video signal can include: determining an EQ (EQualizer) value of the video signal; configuring a gain factor according to the EQ value of the video signal; configuring a fifth register of an AD chip according to a first type, and detecting the video signal; and if the detection state of the Carrier PLL Lock is detected and the lock state of the Carrier PLL Lock is locked, determining that the type of the video signal is the first type.

Specifically, in this example, if the second data of the video signal read by the AD chip is 0x00, the SoC chip may first determine the EQ value of the video signal, that is, determine a degree of attenuation after the video signal is transmitted.

For example, the EQ value of the video signal is calculated according to the degree of attenuation of the Carrier PLL Lock of the video signal. For specific implementation, reference may be made to the relevant description in the existing related solutions, and details are not described herein in the embodiments of the present application.

After determining the EQ value of the video signal, the SoC chip may configure the corresponding gain factor of the AD chip according to the EQ value, and perform attenuation compensation on the video signal by adjusting the gain.

Considering that after completing the attenuation compensation on the video signal, the fifth register generally only needs to be configured according to the correct video signal type, and the Carrier PLL Lock can be detected from the video signal, that is, the detection state of the Carrier PLL Lock is detected and the locked state of the Carrier PLL Lock is locked, i.e., SLOCK is in the locked state, and therefore, the fifth register can be configured in turn according to the first type and the second type, and Carrier PLL Lock detection is performed, such that the type of the video signal can be identified.

Accordingly, the SoC chip may first configure the fifth register according to the first type and detect the video signal. If the detection state of the Carrier PLL Lock is detected and the lock state of the Carrier PLL Lock is locked, it is determined that the type of the video signal is the first type.

Further, if the AD chip does not detect the Carrier PLL Lock, that is, the detection state of the Carrier PLL Lock is not detected, or the AD chip detects the Carrier PLL Lock but the lock state of the Carrier PLL Lock is not locked, the SoC chip may configure the fifth register according to the second type, and detect the video signal again. In this case, if the detection state of the Carrier PLL Lock is detected and the lock state of the Carrier PLL Lock is locked, the type of the video signal is determined as the second type.

Figure 6:
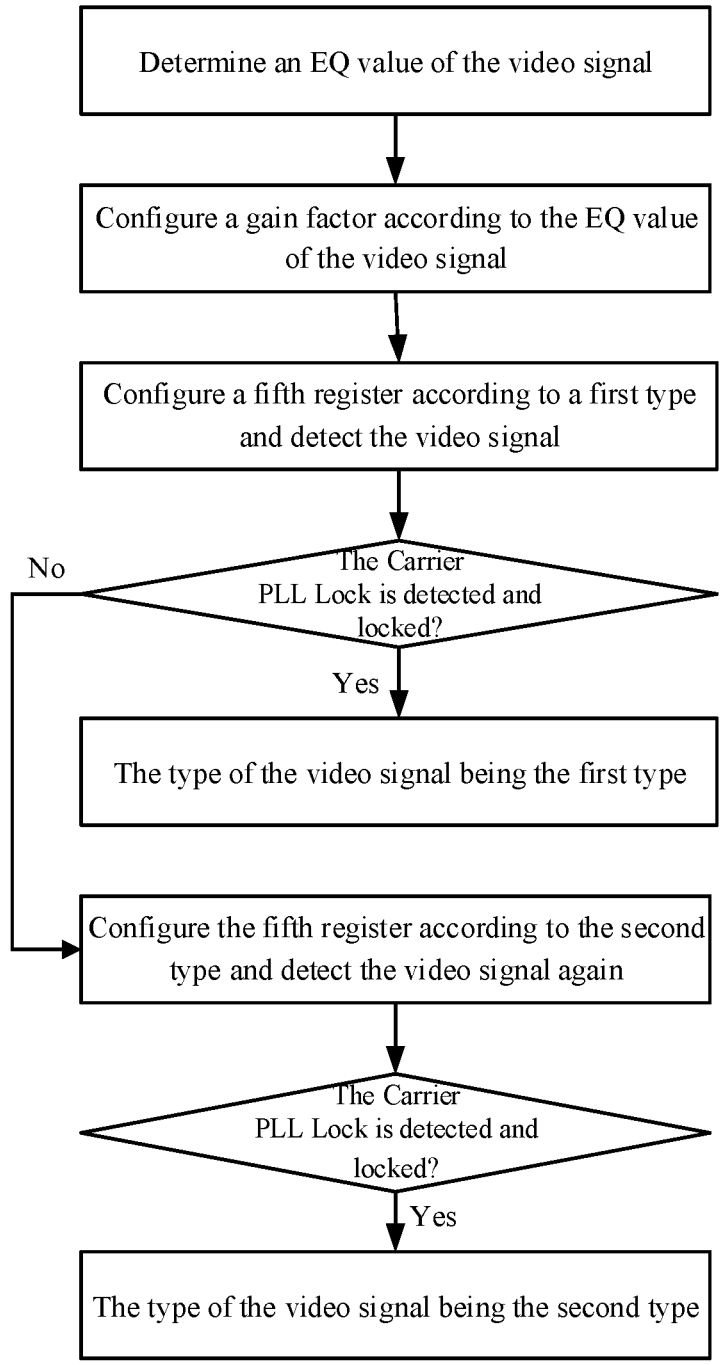
FIG. 6 is a flowchart of a video signal type identification method according to another exemplary embodiment of the present application.

An implementation flowchart of identifying a type of a video signal according to a detection state and a lock state of a Carrier PLL Lock of the video signal can be shown in FIG. 6.

It should be noted that, in embodiments of the present application, after the SoC chip configures the fifth register according to the first type or the second type, if the AD chip does not detect a Carrier PLL Lock, or the AD chip detects the Carrier PLL Lock but the Carrier PLL Lock is not locked, the SoC chip can determine that an unknown signal is received, or perform attenuation compensation and type identification on the video signal again, and the specific implementation is not limited herein.

In addition, in embodiments of the present application, in addition to first configuring the fifth register according to the first type, and then configuring the fifth register according to the second type, the SoC chip may also first configure the fifth register according to the second type, and then configure the fifth register according to the first type, which is not described in detail herein.

In embodiments of the present application, the above implementation manner of identifying the type of the video signal according to the PTZ signal in a single blanking line (a first target blanking line or a second target blanking line) of the video signal is merely a specific example in embodiments of the present application, and is not a limitation to the scope of protection of the present application. In embodiments of the present application, the type of the video signal may also be identified according to PTZ signals in a plurality of blanking lines of the video signal. For example, the AD chip can respectively read PTZ signals in the 23-th to 26-th blanking lines of the video signal, and if the data read according to the PTZ signals in the 23-th to 26-th blanking lines of the video signal is all 0x00, the DVR can identify the type of the video signal as the first type. If the data read by the PTZ signals in the 23-th to 26-th blanking lines of the video signal is all data greater than 0x00, the DVR may identify that the type of the video signal is a second type, and the specific implementation thereof is not described herein.

To make those skilled in the art better understand the technical solutions provided by embodiments of the present application, the technical solutions provided by embodiments of the present application will be described below with reference to specific examples.

Figure 7:
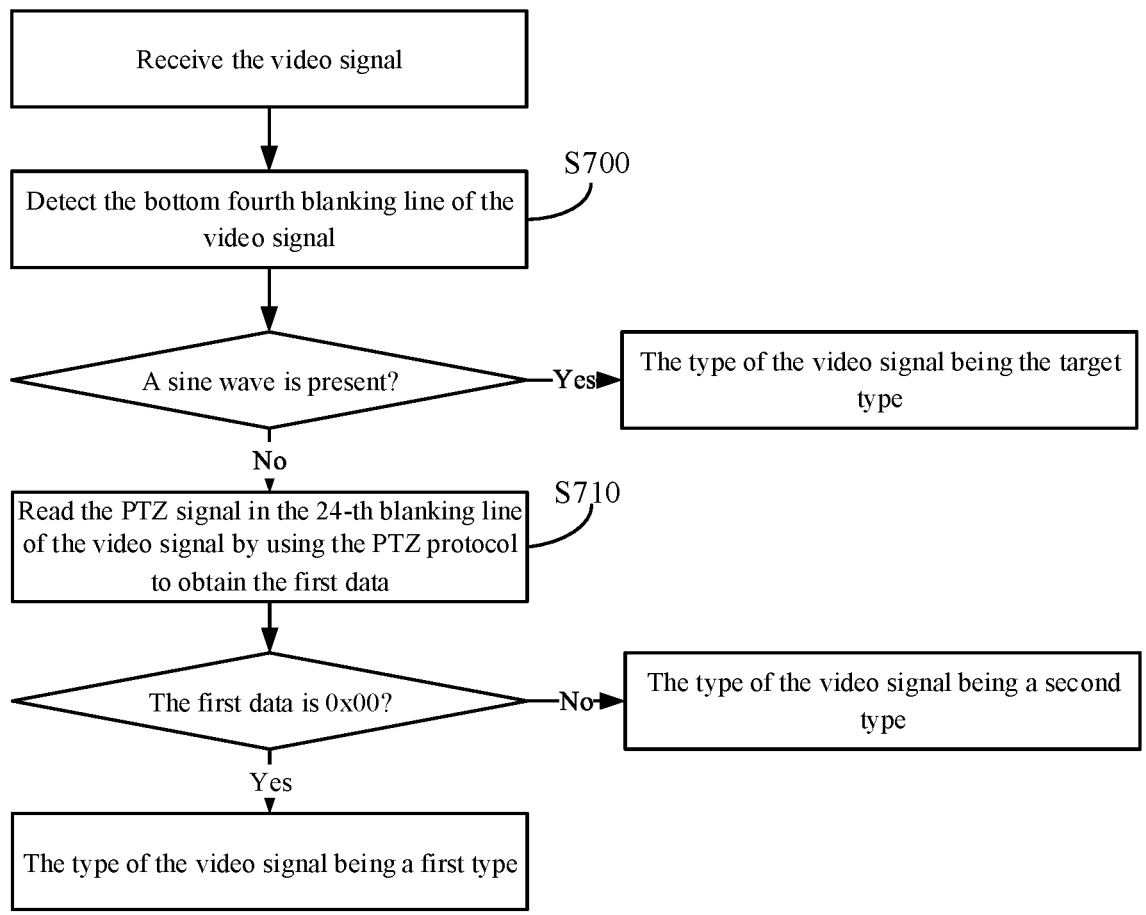
FIG. 7 is a flowchart of a video signal type identification method according to still another exemplary embodiment of the present application.

In an example, taking a first target blanking line being a 24-th blanking line as an example for illustration, the implementation process of the video signal identification solution can be shown in FIG. 7, which may include the following steps.

At step S700, in a case that it is determined that the video signal with the first target format includes multiple types, the presence or absence of a sine wave in the bottom fourth blanking line of the video signal is detected. If a sine wave is present, it is determined the type of the video signal is the target type; and otherwise, the process proceeds to step S710.

In this embodiment, the SoC chip can determine whether the type of the video signal is the target type based on the presence or absence of a sine wave in the bottom fourth blanking line of the video signal.

If there is a sine wave in the bottom fourth blanking line of the video signal, it is determined that the type of the video signal is the target type; and if there is no sine wave in the bottom fourth blanking line of the video signal, it is determined that the type of the video signal is not the target type.

At step S710, the PTZ signal in the 24-th blanking line of the video signal is read by using the PTZ protocol to obtain the first data read. If the first data is 0x00, the type of the video signal is determined to be a first type; and otherwise, the type of the video signal is determined to be a second type.

In this embodiment, if it is determined that the type of the video signal is not the target type, the AD chip may use the PTZ protocol to read the PTZ signal in the 24-th blanking line of the video signal to obtain the first data. If the first data is 0x00, the SoC chip may determine that the type of the video signal is the first type. If the first data is not 0x00, that is, the first data read from the PTZ signal in the 24-th blanking line of the video signal is greater than 0x00, the SoC chip may determine that the type of the video signal is the second type.

Figure 8:
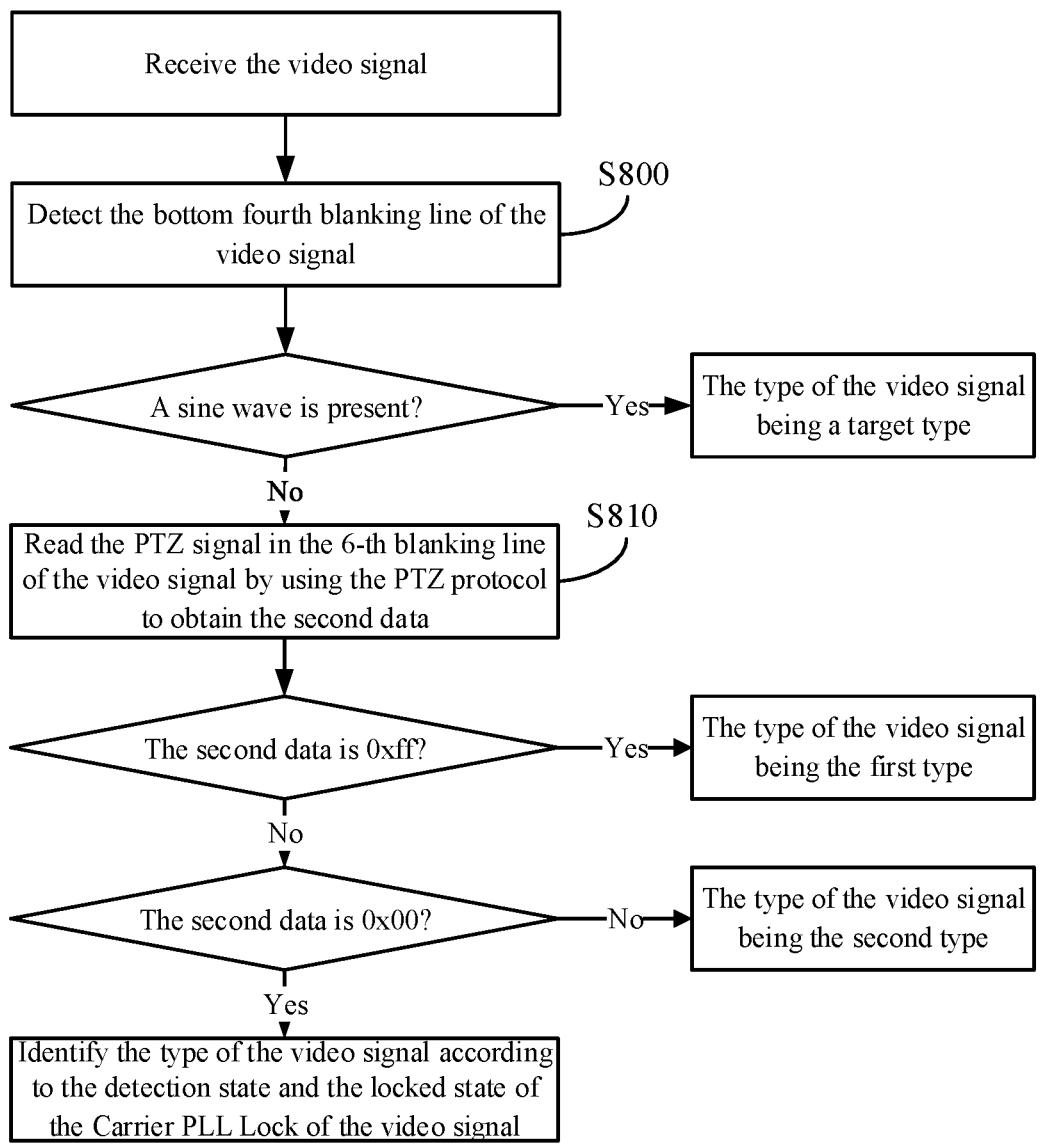
FIG. 8 is a flowchart of a video signal type identification method according to yet another exemplary embodiment of the present application.

In this embodiment, taking the second target blanking line being the 6-th blanking line as an example for illustration, the implementation process of the video signal identification solution can be shown in FIG. 8, which can include the following steps.

At step S800, in a case that it is determined that the video signal with the first target format includes a plurality of types, it is detected whether a sine wave exists in the bottom fourth blanking line of the video signal. If the sine wave exists, it is determined that the type of the video signal is a target type; and otherwise, the process proceeds to step S810.

In this embodiment, the SoC chip can determine whether the type of the video signal is a target type according to whether there is a sine wave in the bottom fourth blanking line of the video signal.

If there is a sine wave in the bottom fourth blanking line of the video signal, it is determined that the type of the video signal is the target type; and if there is no sine wave in the bottom fourth blanking line of the video signal, it is determined that the type of the video signal is not the target type.

At step S810, the PTZ signal in the 6-th blanking line of the video signal is read by using the PTZ protocol to obtain the second data read. If the second data is 0xff, it is determined that the type of the video signal is the first type; if the second data is 0x00, the type of the video signal is identified according to the detection state and the locked state of the Carrier PLL Lock of the video signal; and if the second data is neither 0x00 nor 0xff, it is determined that the type of the video signal is the second type.

In this embodiment, if the first target format of the video signal is neither 4M25/30 nor 5M20, the AD chip reads the PTZ signal in the 6-th blanking line of the video signal according to the PTZ signal receiving parameter to obtain the second data. If the second data is 0xff, the SoC chip may determine that the type of the video signal is the first type. If the second data is 0x00, the SoC chip may further identify the type of the video signal according to the detection state and the locked state of the Carrier PLL Lock of the video signal, and for specific implementation, reference may be made to the process shown in FIG. 6. If the second data is neither 0x00 nor 0xff, that is, the second data of the video signal is data between 0x00 and 0xff, the SoC chip may determine that the type of the video signal is the second type.

In embodiments of the present application, when a video signal is received, a PTZ signal in a blanking line of the video signal is read by using the PTZ protocol to obtain data read, and the type of the video signal is identified according to the data read, thereby improving the accuracy of the type identification of the video signal, and finally obtaining the format and type of the video signal.

Further, in embodiments of the present application, in practical applications, after the format and type of the video signal are determined according to the described method, there is also a possibility that the format of the video signal is wrong, that is, a case that the video signal is mis-locked may occur. Thus, the determination of mis-locking can be added after the determination of the format and the type of the video signal is completed.

For example, taking the formats being 4M12.5 and 720P25 as an example, the two formats share a same format value, and line durations of video signals of the two formats are same.

If a format of a video signal received currently is 4M12.5, however, after the SoC chip configures a second register corresponding to the format 4M12.5 according to the format 720P25, it is detected that the HLOCK and the VLOCK of the received video signal are both in a locked state. In this case, the SoC chip considers that the format of the received signal is 720P25, and thus the mis-determination occurs. Further, in the subsequent process, the video signal processing abnormality may be caused due to the video signal format identification error. Therefore, when the video signal format is identified in the above manner, there is also a need to determine whether there is a video signal mis-determination.

Accordingly, in an embodiment of the present disclosure, after identifying the type of the video signal according to the data read, the method further includes: detecting whether a Carrier PLL Lock of the video signal received is in a locked state; and if the Carrier PLL Lock of the video signal received is in an unlocked state, determining that the video signal received is mis-locked.

In this embodiment, if the video signal is mis-locked, generally, the Carrier PLL Lock of the video signal cannot be locked (that is, the state of the SLOCK is unlocked), and thus, it can be determined whether the video signal is mis-locked according to whether the Carrier PLL Lock is in the locked state.

Accordingly, after determining the format and type of the video signal, it may be detected whether the lock state of the Carrier PLL Lock of the received video signal is locked; if the locked state of the Carrier PLL Lock is locked, it is determined that the format of the received video signal is the first target format; and if the lock state of the Carrier PLL Lock is unlocked, it is determined that the received video signal is mis-locked.

In embodiments of the present application, if the SoC chip determines that the received video signal is mis-locked, the SoC chip may re-identify the format of the received video signal according to the method shown in FIG. 1, or identify the format of the received video signal according to other policies, and the specific implementation thereof is not described herein.

Further, in this embodiment, if the signal is accessed through the long cable, the SLOCK cannot be locked immediately due to the attenuation of the signal, and the SLOCK can be locked only after the gain is adjusted automatically or manually to compensate for the attenuation. Therefore, before the attenuation compensation is completed, it cannot be determined whether the SLOCK is not locked due to mis-locking of the video signal, or the SLOCK is not locked due to attenuation of the signal.

In a case that the type of the video signal is TVI, if the lock state of the Carrier PLL Lock of the received video signal is unlocked, before determining that the received video signal is mis-locked, the method can further include: setting an adjustment range of a gain to a maximum and adjusting the gain to a maximum; detecting whether the lock state of the Carrier PLL Lock of the received video signal is locked; and if the lock state of the Carrier PLL Lock of the received video signal is unlocked, performing the above step of determining that the video signal is mis-locked.

In this embodiment, if it is determined that the locked state of the Carrier PLL Lock of the received video signal is unlocked, the SoC chip may set the adjustment range of the gain to the maximum and adjust the gain to the maximum, so as to avoid that the SLOCK cannot be locked due to signal attenuation, and detect whether the locked state of the Carrier PLL Lock of the received video signal is locked.

If the lock state of the Carrier PLL Lock of the received video signal is unlocked, the SoC chip may determine that the received video signal is mis-locked. If the lock state of the Carrier PLL Lock of the received video signal is locked, the SoC chip may determine that the determination of the format of the received video signal is correct.

If the type of the video signal is AHD, since the gain for video signal with this type cannot be adjusted automatically, the EQ value of the video signal may be determined first. The gain factor is configured according to the EQ value of the video signal. Then, it is detected whether the detected state of the Carrier PLL Lock of the received video signal is detected and whether the locked state of the Carrier PLL Lock is locked. If the detected state of the Carrier PLL Lock is detected and the locked state of the Carrier PLL Lock is locked, it can be determined that the format of the received video signal is correctly determined; and otherwise, the step of determining the video signal mis-locking is performed.

In another embodiment of the present application, frame rates of target video signals with multiple different formats sharing the same format value may be different, that is, a duration of a frame of the target video signals with multiple different formats may be different. If the duration of a frame of one of the target video signals with multiple different formats is an even multiple of the duration of a frame of other of the target video signals, for the duration of a frame of the one of the target video signals, the other of the target video signals may have even-numbered frames of video signal. A middle line and a certain number of lines above and below the middle line of a frame of the one of the target video signals are an image information zone for the one of the target video signals and a blanking zone for the other of the target video signals. In this case, different formats can also be distinguished by using the difference between the voltage values of the image information zone and the blanking zone.

In another embodiment of the present application, if the second register is configured according to the first target format and the received video signal is detected to be in the locked state, before determining that the format of the received video signal is the first target format, the method can further include: if a frame rate of the first target video signal is half of the frame rate of other of the target video signals, reading a voltage value of a target line in a frame of the first target video signal, where the target line is any one of lines between a predetermined number of lines above and below a middle line in the frame of the first target video signal; and if the voltage value of the target line is positive, the format of the received video signal is determined to be the first target format; and if the voltage value of the target line is negative or zero, the received video signal is determined to be mis-locked.

In still another embodiment of the present application, if the second register is configured according to the first target format and the received video signal is detected to be in the locked state, before determining that the format of the received video signal is the first target format, the method can further include: if a frame rate of the first target video signal is twice of the frame rate of other of the target video signals, reading a voltage value of a target line in a frame of the first target video signal, where the target line is any one of lines between a predetermined number of lines above and below a middle line in the frame of the first target video signal; if the voltage value of the target line is negative or zero, the received video signal is determined to be the first target format; and if the voltage value of the target line is positive, the format of the received video signal is determined to be mis-locked.

If the frame rate of the first target video signal is half of the frame rate of the other of the target video signals, i.e., the duration of each frame of the first target video signal is twice of the duration of each frame of the other of the target video signals, there will be two frames of the other of the target video signals within the duration of a frame of the first target video signal. The middle of a frame of the first target video signal corresponds to the beginning of a frame of the other of the target video signals.

Since the beginning of a frame of video signal is a field synchronization signal, the field synchronization signal is a low level (that is, the voltage value is negative). Since the middle of a frame of video signal is image information, the voltage is a positive level value (that is, the voltage value is positive). Since several lines at the beginning and end of a frame of video signal are the blanking zone, in addition to that some specific lines have synchronization signals, the level of the blanking zone is zero by default, i.e., the voltage value is zero. Thus, it is possible to determine whether the format of the received video signal is the first target format according to the voltage value of any one of lines (referred to herein as the target line) between a predetermined number (which may be determined according to the number of lines in the image information zone and the number of lines in the blanking zone of the first target video signal and other of the target video signals) of lines above and below a middle line of the first target video signal, and further determine whether the received video signal is mis-locked.

For example, taking formats being 4M12.5 and 720P25 as an example, for 4M12.5 signal, there are 12.5 frames per second, that is, the duration of a frame is 80 ms, and for 720P25 signal, there are 25 frames per second, that is, the duration of one frame is 40 ms. Therefore, there is one frame of 4M12.5 video signal or two frames of 720P25 video signal within a duration of 80 ms. The middle of the frame with 4M12.5 is the beginning of a frame with 720P25, and the corresponding schematic diagram can be shown in FIG. 2.

It is assumed that the SoC chip configures a second register according to 4M12.5 (that is, the first target format is 4M12.5), and detects that the received video signal is in a locked state, and at this time, the AD chip reads the voltage value of the middle line of a frame of the first target video signal.

If the voltage value of the middle line is positive, the SoC chip may determine that the format of the received video signal is 4M12.5. If the voltage value of the middle line is negative, the SoC chip may determine that the format of the received video signal is not 4M12.5, that is, the received video signal is mis-locked.

It should be noted that, the method for determining the mis-locking with the voltage value may be performed after determining the format of the video signal, or may be performed after determining the type of the video signal. The present application does not limit this.

Figure 9:
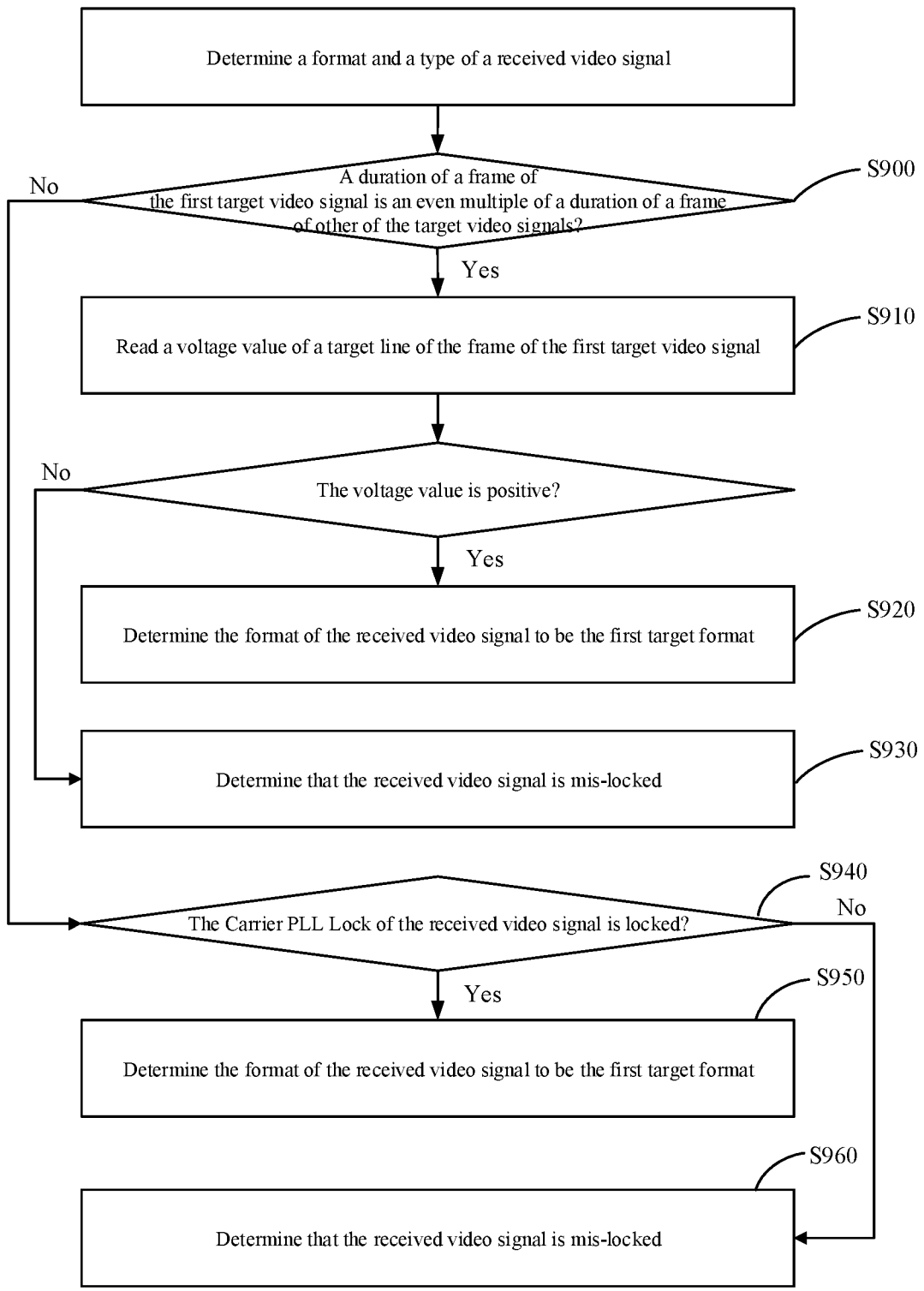
FIG. 9 is a flowchart of a video signal mis-locking identification method according to an exemplary embodiment of the present application.

Further, referring to FIG. 9, it is a flowchart of a video signal mis-locking identification method according to an embodiment of the present application. The method can include the following steps.

At step S900, if the format and type of the received video signal are determined, it is determined whether a duration of a frame of the first target video signal is an even multiple of the duration of a frame of other of the target video signals. If yes, the process proceeds to step S910; and otherwise, the process proceeds to step S940.

In embodiments of the present application, for the specific implementation of determining the format and type of the received video signal by the SoC chip, reference may be made to the relevant description in the processes of the methods shown in FIG. 1 and FIG. 5.

In embodiments of the present application, after determining the format and type of the received video signal, the SoC chip may determine whether the duration of a frame of the first target video signal is an even multiple of a frame of the other of the target video signals.

At step S910, a voltage value of a target line of the frame of the first target video signal is read. If the voltage value is positive, the process proceeds to step S920; and if the voltage value is negative or zero, the process proceeds to step S930.

At step S920, the format of the received video signal is determined to be the first target format.

At step S930, it is determined that the received video signal is mis-locked.

In embodiments of the present application, if the duration of a frame of the first target video signal is an even multiple of the duration of a frame of other of the target video signals, there are an even-numbered frames of other of the target video signals in the duration of a frame of the first target video signal. The middle in a frame of the first target video signal corresponds to the beginning of a frame of the other of the target video signals.

Assuming that the SoC chip determines the first target format as 4M12.5 and determines the type of the video signal as the target type, at this time, the SoC chip reads the voltage value of the middle line in a frame of the first target video signal.

If the voltage value of the middle line is positive, the DVR can determine the format of the received video signal is 4M12.5; if the voltage value of the middle line is negative or zero, the DVR can determine that the format of the received video signal is not 4M12.5, that is, the received video signal is mis-locked.

At step S940, it is detected whether the Carrier PLL Lock of the received video signal is in a locked state. If the Carrier PLL Lock is in the locked state, the process proceeds to step S950; and otherwise, the process proceeds to step S960.

At step S950, the format of the received video signal is determined to be the first target format.

At step S960, it is determined that the received video signal is mis-locked.

In embodiments of the present application, for specific implementations of step S940 to step S960, reference may be made to the relevant description of Carrier PLL Lock determination in the foregoing embodiments, and details are not described herein again.

At step S930 and step S960, if it is determined that the received video signal is mis-locked, the SoC chip may proceed to step S300 in FIG. 3 to re-identify the format of the received video signal, or identify the format of the received video signal according to other policies.

The methods provided in the present application are described above. The apparatuses provided in the present application is described below.

Figure 10:
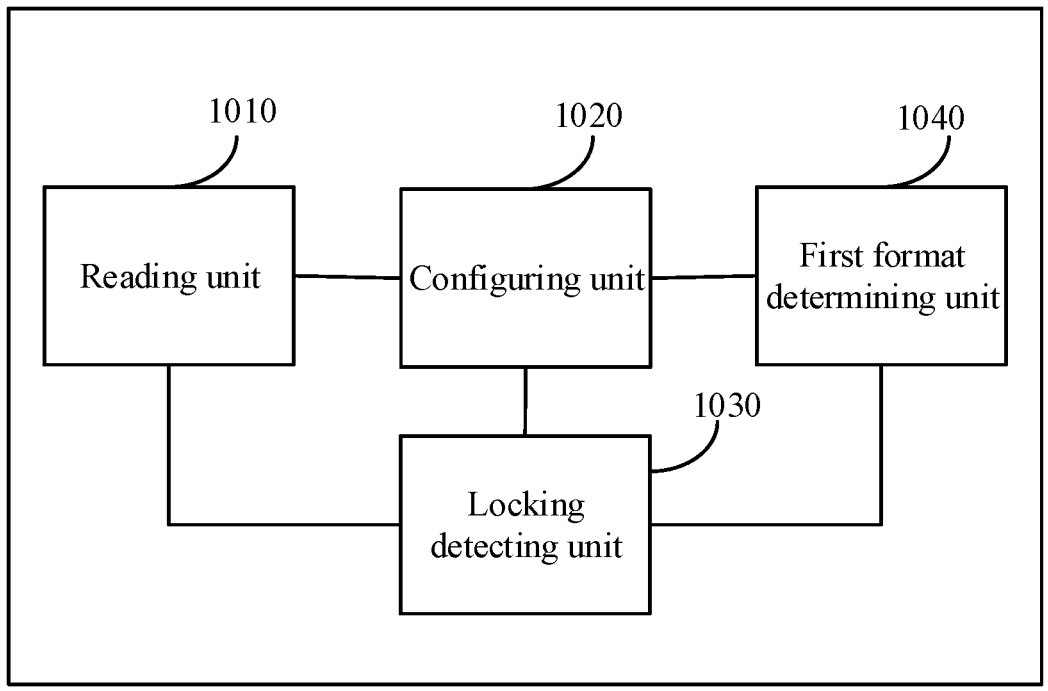
FIG. 10 is a schematic structural diagram of a video signal identification apparatus according to an exemplary embodiment of the present application.

Referring to FIG. 10, it is a schematic structural diagram of a video signal identification apparatus according to an embodiment of the present application. The video signal identification apparatus can be applied to the SoC chip in the above method embodiments. As shown in FIG. 10, the video signal identification apparatus can include the following units.

a reading unit 1010, configured to read a first register to obtain a format value of a video signal received.

a configuring unit 1020, configured to in a case that the format value is shared by target video signals with multiple formats, configure a second register according to at least one of the multiple formats for the target video signals.

a locking detecting unit 1030, configured to detect whether the video signal received is in a locked state.

a first format determining unit 1040, configured to if the configuring unit 1020 configures the second register according to a first target format and the locking detecting unit 1030 detects that the video signal received is in the locked state, determine that a format of the video signal received is the first target format, wherein the first target format is a format of a first target video signal in the target video signals.

Figure 11:
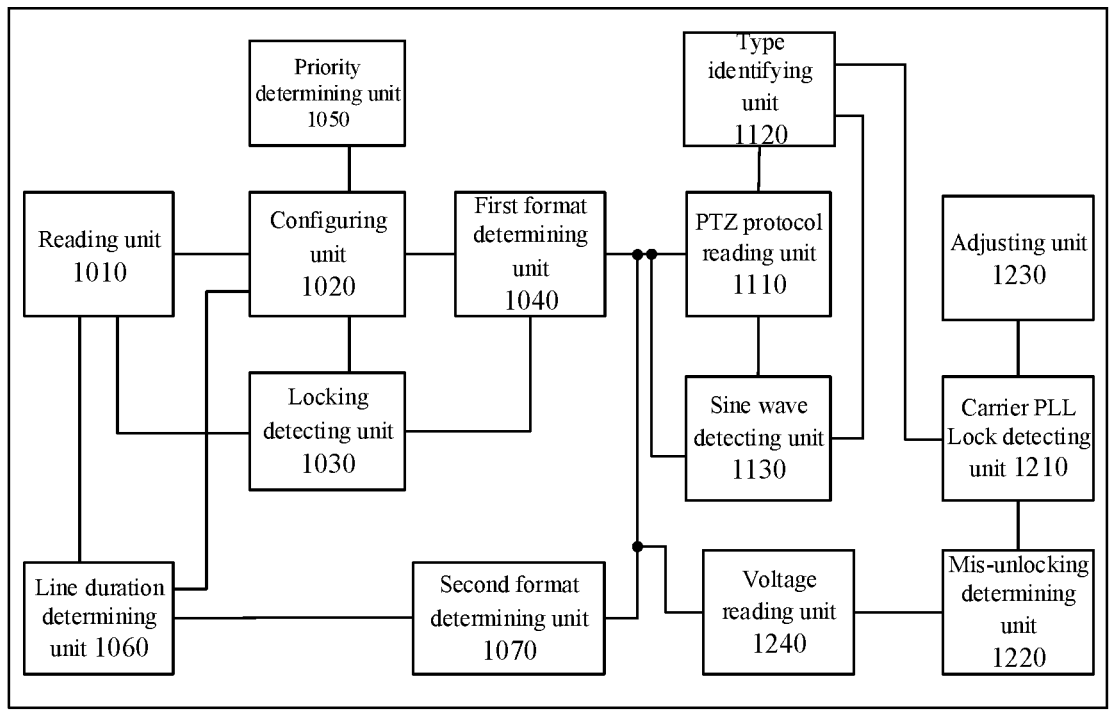
FIG. 11 is a schematic structural diagram of a video signal identification apparatus according to another exemplary embodiment of the present application.

In an optional implementation, as shown in FIG. 11, the apparatus further includes a priority determining unit 1050, configured to determine a priority of a format of each of the target video signals with the multiple formats; the configuring unit 1020 is specifically configured to configure the second register corresponding to the format of the at least one of the target video signals according to a descending order of the priorities.

In an optional implementation, the configuring unit 1020 is specifically configured to: configure a second register according to a format of the target video signal with i-th priority; in a case that the number of configurations is less than Ni, if the video signal received is in an unlocked state, continue to configure the second register according to the format of the target video signal with i-th priority and add 1 to the number of configurations; and in a case that the number of configurations is equal to Ni, if the video signal received is in the unlocked state, set i=i+1 and return to perform the step of configuring the second register according to the format of the target video signal with i-th priority; wherein the larger the i is, the lower the priority is.

In an optional implementation, the larger the i is, the smaller the Ni is.

In an optional implementation, as shown in FIG. 11, the apparatus further includes: a line duration determining unit 1060, configured to determine respective line durations of the target video signals; and a second format determining unit 1070, configured to if the respective line durations of the target video signals are different, determine, according to the respective line durations of the target video signals and a line duration of the video signal received, the format of the video signal received. The configuring unit 1020 is further configured to if at least two of the target video signals have a same line duration, configure the second register according to the at least one of the multiple formats for the target video signals.

In an optional implementation, the second format determining unit 1070 is specifically configured to: read a third register to obtain a line duration value; compare the line duration value and the line duration of each of the target video signals; and in response to determining that the line duration value is the same as the line duration of one of the target video signals, determine a format of the one of target video signals as the first target format of the video signal received.

In an optional implementation, as shown in FIG. 11, the apparatus further includes the following units.

a PTZ protocol reading unit 1110, configured to when the video signal is received, read a PTZ signal in a blanking line of the video signal by using a PTZ protocol to obtain data read.

a type identifying unit 1120, configured to identify a type of the video signal according to the data read.

In an optional implementation, as shown in FIG. 11, the apparatus further includes a sine wave detecting unit 1130, configured to detect whether a sine wave exists in a bottom fourth blanking line of the video signal; the type identifying unit 1120 is configured to if the sine wave exists in the bottom fourth blanking line of the video signal, determine that the type of the video signal is a target type; and the PTZ protocol reading unit 1110 is specifically configured to if the sine wave does not exist in the bottom fourth blanking line of the video signa, read the PTZ signal in the blanking line of the video signal by using the PTZ protocol.

In an optional implementation, the PTZ protocol reading unit 1110 is specifically configured to read the PTZ signal in a first target blanking line of the video signal by using the PTZ protocol to obtain first data read; the type identifying unit 1120 is specifically configured to identify the type of the video signal according to the first data; wherein the first target blanking line is any one of the 23-th to 26-th blanking lines of the video signal.

In an optional implementation, the PTZ protocol reading unit 1110 is specifically configured to read the PTZ signal in a second target blanking line of the video signal by using the PTZ protocol to obtain second data read; the type identifying unit 1120 is specifically configured to: identify the type of the video signal according to the second data; wherein the second target blanking line is any one of the 6-th to 7-th blanking lines of the video signal.

In an optional implementation, the type identifying unit 1120 is further configured to: in response to determining that the second data is 0x00, identify the type of the video signal according to a detection state and a locked state of a Carrier PLL Lock of the video signal.

In an optional implementation, as shown in FIG. 11, the apparatus further includes the following units.

a Carrier PLL Lock detecting unit 1210, configured to after identifying the type of the video signal according to the data read, detect whether a Carrier PLL Lock of the video signal received is in a locked state; and a mis-unlocking determining unit 1220, configured to in response to determining that the Carrier PLL Lock of the video signal received is in an unlocked state, determine that the video signal received is mis-locked.

In an optional implementation, as shown in FIG. 11, the apparatus further includes an adjusting unit 1230, configured to before determining that the video signal received is mis-locked, set an adjustment range of a gain to a maximum and adjust the gain to a maximum.

In an optional implementation, as shown in FIG. 11, the apparatus further includes a voltage reading unit 1240, configured to before determining that the format of the video signal received is the first target format, in response to determining that a frame rate of the first target video signal is half of a frame rate of other of the target video signals, read a voltage value of a target line in a frame of the first target video signal, wherein the target line is any one of lines between a predetermined number of lines above and below a middle line in the frame of the first target video signal; the mis-unlocking determining unit 1220 is further configured to in response to determining that the voltage value of the target line is negative or zero, determine that the video signal received is mis-locked.

According to the video signal identification apparatus in embodiments of the present application, by reading a first register, a format value of a video signal received is obtained; in a case that the format value is shared by target video signals with multiple formats, a second register is configured according to at least one of the multiple formats for the target video signals, and it is detected whether the video signal received is in a locked state; and in response to configuring the second register according to a first target format and detecting that the video signal received is in the locked state, a format of the video signal received is determined as the first target format. The video signal identification apparatus provided in the present application improves the accuracy of video signal identification.

Figure 12:
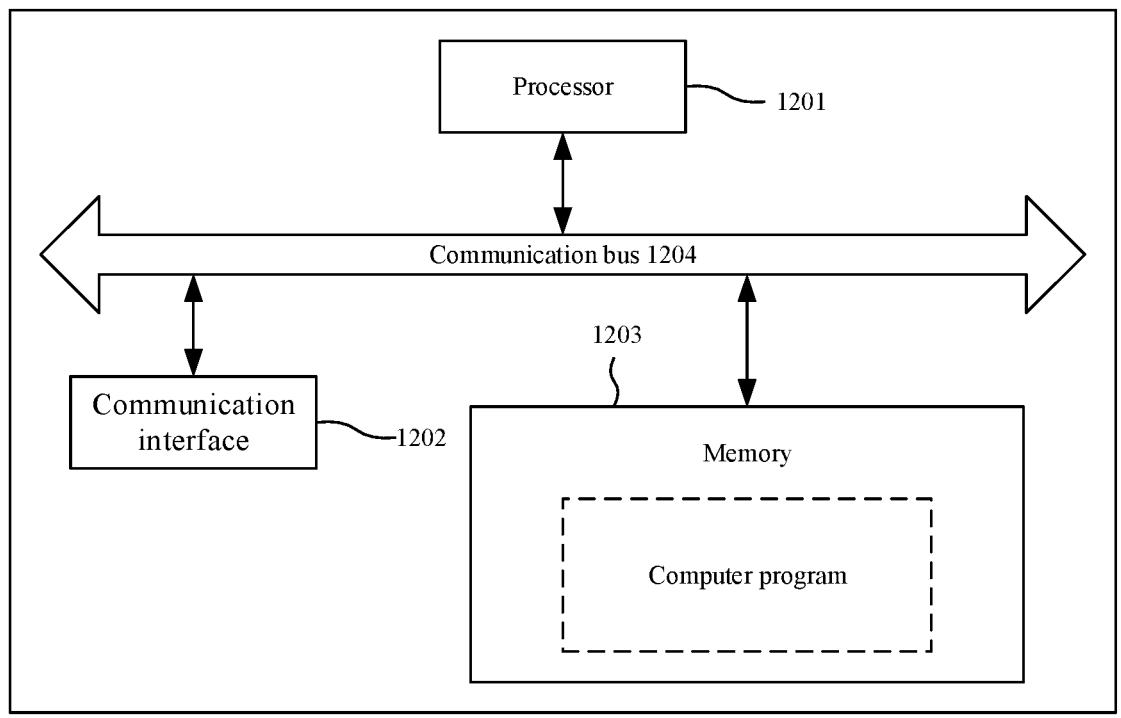
FIG. 12 is a hardware structure diagram of an electronic device according to an exemplary embodiment of the present application.

Referring to FIG. 12, it is a hardware structure diagram of an electronic device according to an embodiment of the present application. The electronic device can include a processor 1201, a communication interface 1202, a memory 1203, and a communication bus 1204. The processor 1201, the communication interface 1202, and the memory 1203 communicate with each other through the communication bus 1204. The memory 1203 stores a computer program. The processor 1201 can execute the video signal identification method described above by executing the program stored in the memory 1203.

The memory 1203 mentioned herein can include any electronic, magnetic, optical or other physical storage apparatus and include or store information such as executable instructions, data, etc. For example, the memory 1203 can include a RAM (Radom Access Memory), a volatile memory, a non-volatile memory, a flash memory, a storage drive (such as a hard disk drive), a solid state disk, a storage disk of any type (such as an optical disk, a dvd, etc.), or a similar storage medium, or a combination thereof Embodiments of the present application further provide a machine readable storage medium storing a computer program, such as, the memory 1203 in FIG. 12. The computer program can be executed by the processor 1201 in the electronic device shown in FIG. 12 to implement the video signal identification method described above.

It should be noted that, herein, relational terms such as first and second, etc. are merely used to distinguish one entity or operation from another entity or operation, and do not necessarily require or imply that there is any such actual relationship or order between these entities or operations. Moreover, the terms "comprising, " "including, " or any other variation thereof, are intended to encompass non-exclusive inclusion such that a process, method, article or device including a series of elements includes not only those elements, but also other elements not explicitly listed, or other elements inherent to such a process, method, article or device. Without more restrictions, the elements defined by the statement "including a " do not preclude the existence of additional identical elements in the process, method, article or device including the elements.

The above description is merely exemplary embodiments of the present application, and is not intended to limit the present application. Any amendments, equivalent replacements, improvements and the like made within the spirit and principle of the present application should be included within the scope of protection of the present application.

The invention claimed is:

1. A video signal identification method, comprising:
reading a first register to obtain a format value of a video signal;
in response to determining that the format value is shared by multiple formats of target video signals,
respectively configuring at least one second register according to at least one of the multiple formats, and detecting whether the video signal is in a locked state after configuring a corresponding second register each time, until detecting that the video signal is in the locked state, and stop configuring the corresponding second register; and
determining one of the at least one of the multiple formats as a format of the video signal, wherein, after configuring a second register according to the one of the at least one of the multiple formats, the video signal is detected to be in the locked state.

2. The method according to claim 1, wherein respectively configuring the at least one second register according to the at least one of the multiple formats for the target video signals and detecting whether the video signal is in the locked state comprising:
determining a priority of a format of each of the target video signals; and
configuring the at least one second register according to a descending order of the priorities and detecting whether the video signal is in the locked state.

3. The method according to claim 2, wherein configuring the at least one second register according to the descending order of the priorities and detecting whether the video signal is in the locked state comprises:
configuring a second register according to a format of the target video signal with i-th priority;
in response to determining that a number of configurations is less than Ni and the video signal is in an unlocked state, continuing to configure the second register according to the format of the target video signal with i-th priority and adding 1 to the number of configurations; and
in response to determining that the number of configurations is equal to Ni and the video signal is in the unlocked state, setting i=i+1 and returning to perform the step of configuring the second register according to the format of the target video signal with i-th priority;
wherein the larger the i is, the lower the priority is.

4. The method according to claim 3, wherein the larger the i is, the smaller the Ni is.

5. The method according to claim 1, further comprising:
before configuring the at least one second register according to the at least one of the multiple formats for the target video signals,
determining respective line durations of the target video signals;
in response to determining that at least two of the target video signals have a same line duration, performing configuring the at least one second register according to the at least one of the multiple formats for the target video signals; and
in response to determining that the respective line durations of the target video signals are different, determining, according to the respective line durations of the target video signals and a line duration of the video signal, the format of the video signal.

6. The method according to claim 5, wherein determining, according to the respective line durations of the target video signals and a line duration of the video signal, the format of the video signal comprises:
reading a third register to obtain a line duration value;
comparing the line duration value and the line duration of each of the target video signals; and
in response to determining that the line duration value is the same as the line duration of one of the target video signals, determining a format of the one of target video signals as the first target format of the video signal.

7. The method according to claim 1, further comprising:
when the video signal is received, reading a Pan/Tilt/Zoom (PTZ) signal in a blanking line of the video signal to obtain data read, wherein the PTZ signal is a signal located at a specific position in a line of a blanking zone of the video signal; and
identifying a type of the video signal according to the data read.

8. The method according to claim 7, further comprising:
before reading the PTZ signal in the blanking line of the video signal,
detecting whether a sine wave exists in a bottom fourth blanking line of the video signal;
in response to determining that the sine wave exists, determining that the type of the video signal is a target type; and
in response to determining that the sine wave does not exist, performing the step of reading the PTZ signal in the blanking line of the video signal.

9. The method according to claim 7, wherein reading the PTZ signal in the blanking line of the video signal to obtain data read comprises: reading the PTZ signal in a first target blanking line of the video signal to obtain first data read;
wherein identifying the type of the video signal according to the data read comprises: identifying the type of the video signal according to the first data;

wherein the first target blanking line is any one of the 23-th to 26-th blanking lines of the video signal.

10. The method according to claim 7, wherein reading the PTZ signal in the blanking line of the video signal to obtain data read comprises: reading the PTZ signal in a second target blanking line of the video signal to obtain second data read;
wherein identifying the type of the video signal according to the data read comprises: identifying the type of the video signal according to the second data;
wherein the second target blanking line is any one of the 6-th to 7-th blanking lines of the video signal.

11. The method according to claim 10, wherein identifying the type of the video signal according to the second data comprises:
in response to determining that the second data is 0x00, identifying the type of the video signal according to a detection state and a locked state of a Carrier PLL Lock of the video signal.

12. The method according to claim 7, further comprising: after identifying the type of the video signal according to the data read,
detecting whether a Carrier PLL Lock of the video signal is in a locked state; and
in response to determining that the Carrier PLL Lock of the video signal is in an unlocked state, determining that the video signal is mis-locked.

13. The method according to claim 12, further comprising:
before determining that the video signal is mis-locked, setting an adjustment range of a gain to a maximum and adjusting the gain to a maximum;
detecting whether the Carrier PLL Lock of the video signal is in the locked state; and
in response to determining that the Carrier PLL Lock of the video signal is in the unlocked state, performing the step of determining that the video signal is mis-locked.

14. The method according to claim 1, further comprising:
in response to determining that the format value is shared by formats of two target video signals, determining the two target video signals as a first target video signal and a second target video signal;
in response to determining that a frame rate of the first target video signal is half of a frame rate of the second target video signal, and detecting that the video signal is in the locked state after configuring the second register according to the first target video signal, reading a voltage value of a target line in a frame of the first target video signal, wherein the target line is any one of lines between a predetermined number of lines above and below a middle line in the frame of the first target video signal; and
in response to determining that the voltage value of the target line is negative or zero, determining that the video signal received is mis-locked.

15. An electronic device, comprising:
at least one processor,
a communication interface,
at least one memory, and
a communication bus,
wherein the at least one processor, the communication interface, and the at least one memory communicate with each other through the communication bus;
wherein the at least one memory is configured to store a computer program
for execution by the at least one processor to perform operations comprising:

reading a first register to obtain a format value of a video signal;
in response to determining that the format value is shared by multiple formats of target video signals, respectively configuring at least one second register according to at least one of the multiple formats, and detecting whether the video signal is in a locked state after configuring a corresponding second register each time, until detecting that the video signal is in the locked state, and stop configuring the corresponding second register; and
determining one of the at least one of the multiple formats as a format of the video signal received is the first target format, wherein, after configuring a second register according to the one of the at least one of the multiple formats, the video signal is detected to be in the locked state.

16. The electronic device according to claim 15, wherein the operations further comprise:
when the video signal is received, reading a PTZ signal in a blanking line of the video signal to obtain data read, wherein the PTZ signal is a signal located at a specific position in a line of a blanking zone of the video signal; and
identifying a type of the video signal according to the data read.

17. The electronic device according to claim 16, wherein the operations further comprise: before reading the PTZ signal in the blanking line of the video signal,
detecting whether a sine wave exists in a bottom fourth blanking line of the video signal;
in response to determining that the sine wave exists, determining that the type of the video signal is a target type; and
in response to determining that the sine wave does not exist, performing the step of reading the PTZ signal in the blanking line of the video signal.

18. The electronic device according to claim 16, wherein the operations further comprise: after identifying the type of the video signal according to the data read,
detecting whether a Carrier PLL Lock of the video signal is in a locked state; and
in response to determining that the Carrier PLL Lock of the video signal is in an unlocked state, determining that the video signal is mis-locked.

19. The electronic device according to claim 15, wherein the operations further comprise:
in response to determining that the format value is shared by formats of two target video signals, determining the two target video signals as a first target video signal and a second target video signal;
in response to determining that a frame rate of the first target video signal is half of a frame rate of the second target video signal, and detecting that the video signal is in the locked state after configuring the second register according to the first target video signal, reading a voltage value of a target line in a frame of the first target video signal, wherein the target line is any one of lines between a predetermined number of lines above and below a middle line in the frame of the first target video signal; and
in response to determining that the voltage value of the target line is negative or zero, determining that the video signal is mis-locked.

20. A non-transitory computer readable storage medium storing a computer program for execution by at least one processor to implement operations comprising:

reading a first register to obtain a format value of a video signal;

in response to determining that the format value is shared by multiple formats of target video signals, respectively configuring at least one second register according to at least one of the multiple formats, and detecting whether the video signal is in a locked state after configuring a corresponding second register each time, until detecting that the video signal is in the locked state, and stop configuring the corresponding second register; and determining one of the at least one of the multiple formats as a format of the video signal is the first target format, wherein, after configuring a second register according to the one of the at least one of the multiple formats, the video signal is detected to be in the locked.

* * * * *